(12) United States Patent
Cook et al.

(10) Patent No.: US 11,770,376 B2
(45) Date of Patent: Sep. 26, 2023

(54) COMPUTER-IMPLEMENTED SYSTEMS FOR DISTRIBUTED AUTHORIZATION AND FEDERATED PRIVACY EXCHANGE

(71) Applicant: IDENTOS Inc., Toronto (CA)

(72) Inventors: Mike Cook, Toronto (CA); Alec Laws, Toronto (CA); James Carter, Toronto (CA)

(73) Assignee: IDENTOS Inc., Toronto (CA)

( * ) Notice: Subject to any disclaimer, the term of this patent is extended or adjusted under 35 U.S.C. 154(b) by 175 days.

(21) Appl. No.: 17/150,683

(22) Filed: Jan. 15, 2021

(65) Prior Publication Data

US 2021/0218742 A1 Jul. 15, 2021

Related U.S. Application Data

(60) Provisional application No. 62/961,280, filed on Jan. 15, 2020.

(51) Int. Cl.
*H04L 9/40* (2022.01)

(52) U.S. Cl.
CPC ...... *H04L 63/0884* (2013.01); *H04L 63/0807* (2013.01); *H04L 63/0815* (2013.01); *H04L 63/0892* (2013.01); *H04L 63/102* (2013.01)

(58) Field of Classification Search
CPC ............. H04L 63/0884; H04L 63/0807; H04L 63/0815; H04L 63/0892; H04L 63/102;
(Continued)

(56) References Cited

U.S. PATENT DOCUMENTS

| 7,519,826 B2 | 4/2009 | Carley |
| 2004/0002878 A1 | 1/2004 | Hinton |

(Continued)

FOREIGN PATENT DOCUMENTS

| WO | 2012119620 A1 | 9/2012 |
| WO | 2014032543 A1 | 3/2014 |

OTHER PUBLICATIONS

European Patent Office, Extended European Search Report for EP Patent App. No. 21020018.4, dated Mar. 1, 2021.

*Primary Examiner* — Huan V Doan
(74) *Attorney, Agent, or Firm* — Own Innovation; James W. Hinton

(57) ABSTRACT

Computer-implemented systems and methods for authorization are provided. A system for distributed authorization includes a resource server which stores a protected resource of a resource owner and a service provider client device which provides a service which uses the protected resource. The system also includes a federated privacy exchange system configured to provide an authorization service for allowing the service provider client device to access the protected resource according to permissions data. The federated privacy exchange system includes a privacy-respecting authorization server configured to store a resource definition for the protected resource, and an agent device configured to provide an agent interface for managing credentials and controlling permissions and policies at the authorization server and store protected data including any one or more of account identifier data, authenticator data, resource server relationship data, and permissions data.

17 Claims, 19 Drawing Sheets

(58) Field of Classification Search
CPC ......... H04L 63/08; H04L 63/10; G06F 21/31; G06F 21/41; H04W 12/06
See application file for complete search history.

(56) References Cited

U.S. PATENT DOCUMENTS

| | | | |
|---|---|---|---|
| 2012/0011567 A1* | 1/2012 | Cronk | H04N 21/25816 726/28 |
| 2013/0007846 A1* | 1/2013 | Murakami | H04W 12/0431 726/4 |
| 2016/0366183 A1* | 12/2016 | Smith | H04L 63/06 |
| 2017/0251025 A1* | 8/2017 | Varley | H04L 9/3236 |
| 2019/0156000 A1 | 5/2019 | Hoffmann et al. | |
| 2019/0332807 A1* | 10/2019 | LaFever | G06F 21/6254 |
| 2020/0127994 A1* | 4/2020 | Kukreja | G06F 21/31 |
| 2021/0099297 A1* | 4/2021 | Mane | H04L 9/3213 |
| 2021/0306320 A1* | 9/2021 | Squire | H04W 4/12 |
| 2022/0046018 A1* | 2/2022 | Mullender | H04L 63/126 |

* cited by examiner

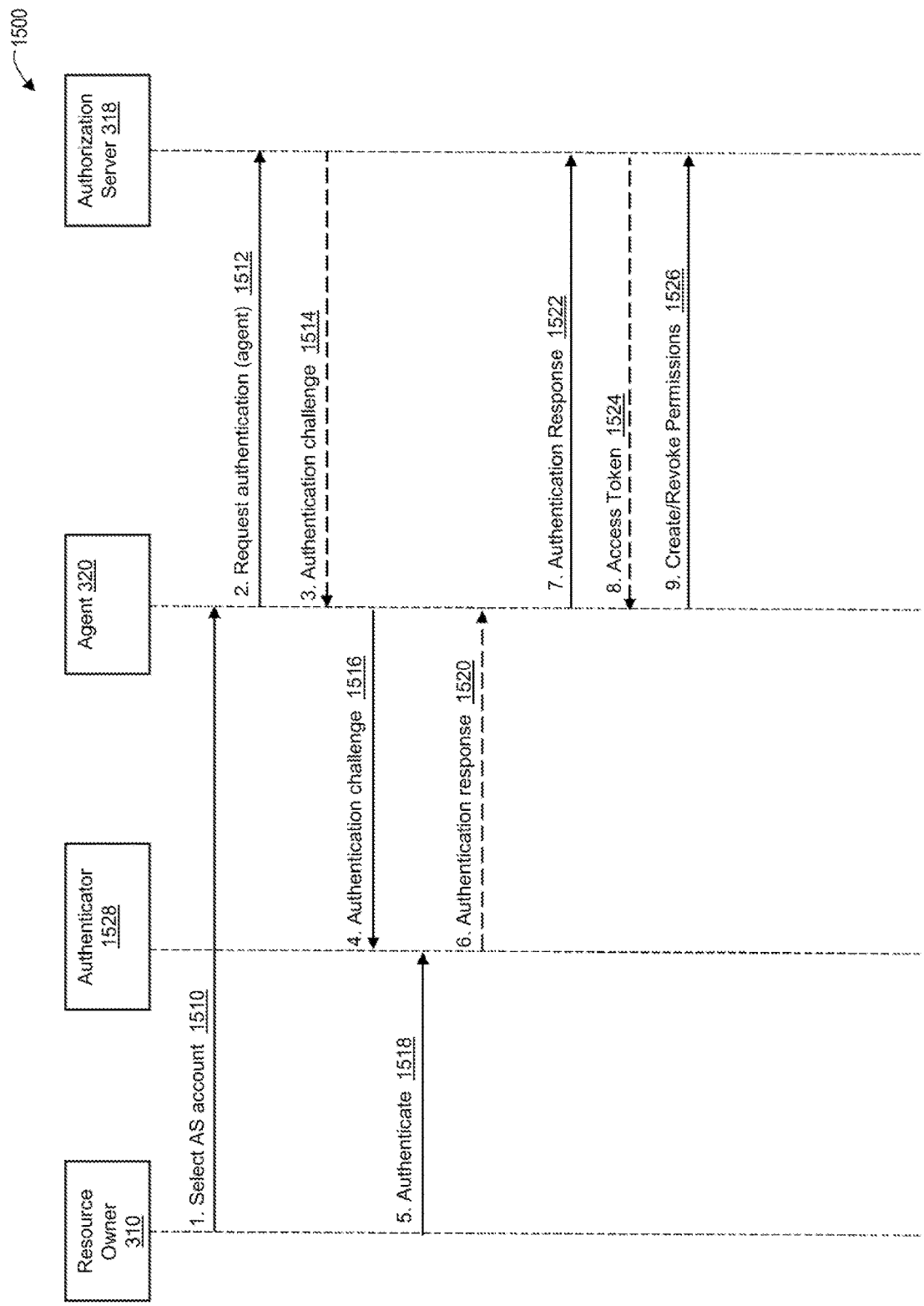

COMPUTER-IMPLEMENTED SYSTEMS FOR DISTRIBUTED AUTHORIZATION AND FEDERATED PRIVACY EXCHANGE

TECHNICAL FIELD

The following relates generally to identity and access management, and more particularly to systems and methods for controlled authorization of resource access between online parties.

INTRODUCTION

Existing protocols for authentication and authorization may not meet the needs of emergent data economies. Existing protocols and standards for authentication and authorization may result in silos of connected without path for user journey to create value between silos or outside of that silo. Using existing protocols, in order for a growing number of online data or service providers to connect together, they require 1:1 direct integration and governance, which can result in significant complexity (N×N complexity as the number of parties reach N).

Integration of parties using existing authorization systems creates an "all-knowing authorization server/hub" that collects and holds the relationships and transactions of any particular user. Such an approach creates privacy risks and opportunities for surveillance or breach due to central knowledge of private information and digital relationships.

Existing protocols may address only technical capability between parties but not how it extends to legal/regulatory requirements of managing user data, consent and revocation. Existing protocols may not support consent receipts or revocation for user control of the life cycle of their data.

Existing approaches to authorization include direct, federated (OAuth), federated (UMA), and SSI (DID/VC) models. Such existing approaches have shortcomings.

Under a "direct" model, a user interacts directly with a service provider. The user discloses personal data in exchange for a service. This interaction may require some authenticator binding for subsequent service use (e.g. a simple reference number versus a username and password).

Under a typical federated (OAuth) model, the user interacts directly with a service provider. The user discloses personal data from an external data source with which the user has an existing relationship. The data source must maintain an authentication credential for the user and the integrated service. The service no longer requires maintaining identity or authentication credentials. Instead, the service has integration credentials to appropriate data providers.

Under a typical federated (UMA) model, the user must first put resources under protection of an authorization server. They must have some identity at both of those parties. The user can then delegate those resources to other requesting parties and clients. A user directs a service provider to a specific resource. The service is directed to the authorization server where they and the requesting party (RqP) must be identified in order to find appropriate access control for the requested resource. The service is then given authorization to use the resource server API.

Under a typical SSI (DID/VC) model the user directly interacts with a service provider. The user discloses personal data from a holder/agent with which the user has an existing relationship. The data presented was previously issued by an authoritative data source. The agent and data source must maintain an authentication credential for the person. The service no longer requires maintaining identity or authentication credentials. Instead, the service maintains a list of trusted issuers for different data element and must integrate to an identifier/revocation registry to check status of presented information (was issued by the issuer and is still active)

Accordingly, there is a need for an improved system and method for authorization that overcomes at least some of the disadvantages of existing systems and methods.

SUMMARY

A computer-implemented system for distributed authorization is provided. The system includes: a resource server which stores a protected resource of a resource owner and respects authorization server-issued authorization grants; a service provider client device, the service provider client device configured to provide a service which uses the protected resource; a federated privacy exchange system configured to provide an authorization service for allowing the service provider client device to access the protected resource according to permissions data, the federated privacy exchange system comprising: a privacy-respecting authorization server configured to store a resource definition for the protected resource; and an agent device configured to: provide an agent interface for managing credentials and controlling permissions and policies at the authorization server; and store protected data including any one or more of account identifier data, authenticator data, resource server relationship data, and permissions data.

A computer-implemented system for providing an authorization service for allowing a service provider client device to access a protected resource stored at a resource server is also provided. The system includes a privacy-respecting authorization server configured to store a resource definition for the protected resource; and an agent device communicatively connected to the authorization server, the agent device configured to: provide an agent interface for managing credentials and controlling permissions and policies at the authorization server; and store protected data including any one or more of account identifier data, authenticator data, resource server relationship data, and permissions data.

The resource definition may be a centralized resource definition.

The system may include an identity provider device configured to authenticate the resource owner and issue an identity assertion.

The authorization server may be further configured to store a privacy-respecting ledger of resource owner data including account data and permissions data.

The permissions data may record a resource owner-directed data authorization policy including client capability data and resource server capability data.

The identity provider device may be further configured to store user data including any one or more of user information data and credentials data.

The authorization server may be further configured to store a privacy-respecting authorization server registry.

The authorization server may be further configured to control any one or more of a governance registry and a registry of approved clients, resource servers, and agents. In some cases, the governance registry may be configured to control the registry of approved clients, resource servers, and agents.

The agent interface may include a user interface configured to perform any one or more of registering a new account, authenticating to an account, interacting with an authenticator, managing permissions, and handling client resource requests.

The authorization server may be further configured to provide a resource owner interface which can be used by the agent device to authenticate the resource owner. The resource owner interface may be used by the agent device to register the resource owner.

The agent device may act as an OIDC provider to the authorization server.

The authorization server may be further configured to delegate permission gathering and authentication to the agent device upon receiving a request from the service provider client device.

A client capability may be registered generically against the resource definition.

The resource definition may allow policy at the authorization server to be defined against a generic application programming interface ("API") schema.

The protected resource may be registered generically against the resource definition.

The system may enable an OAuth extension which allows a single call to connect to any number of protected resources stored in one or more resource servers.

As part of a client authorization process, the service provider client device may be given a token per granted resource, thereby allowing access to a plurality of resource servers. The token may be given in a capability ticket.

The system may include a resource server adapter. The resource server adapter may provide an interface for the resource owner to set policy or controls over the protected resource. The resource server adapter may resolve requests made to the resource server adapter by the service provider client device, after introspection and inspection of a provided authorization grant, to the resource server's APIs or digital objects.

The resource server adapter may be configured to perform any one or more of: registering the protected resource, recovering a user's data access rights, and establishing trust of authorization grants issued by the authorization server.

The agent device may be configured to perform agent-to-agent interaction with another agent device to allow the resource owner to delegate access to the protected resource (e.g. delegate access directly).

The agent may be configured to connect directly to the resource server based on a mutual registration at the authorization server.

The authorization server may be configured to trust an external governance or capability ledger for cross-federation of authorization servers.

The resource server may be configured to verify an intention of the resource owner based on conveyed authorization information. The conveyed authorization information may be conveyed through an authorization grant or an introspection interface.

The resource server may be configured to issue credentials directly to the agent device either with data for direct presentation or to establish key material for the resource owner to set policy at the authorization server.

A capability of the service provider client device or the resource server may be defined against the resource definition, the resource definition comprising a generic interface schema, and the protected resource may be registered generically against the resource definition.

A method of authorizing access by a service provider client to a protected resource stored at a resource server using a centralized resource definition is also provided. The method includes defining client capabilities and resource server capabilities against a generic resource definition, the generic resource definition comprising a generic interface schema; storing the generic resource definition at an authorization server; and registering the protected resource generically against the generic resource definition.

The method may include defining policy conditions comprising authorization grant rules at the authorization server against the generic interface schema.

The generic resource definition may define the structure of a protected resource API for the protected resource, the protected resource API to be presented by the resource server to the server provider client, and the protected resource API may be accessible by the service provider client using an authorization token issued by the authorization server.

The method may include presenting the protected resource API for the protected resource to the service provider client, where the structure of the protected resource API is defined by the generic resource definition.

The method may include issuing, by the authorization server, an authorization token which is operable by the service provider client to access the protected resource API.

The method may include accessing, by the service provider client, the protected resource API using an authorization token issued by the authorization server.

The method may include fulfilling the generic interface schema for a specific service provider client by a specific resource server. The specific resource server receives a generic request from a specific service provider and resolves the generic request.

The method may include receiving, at the authorization server, user consent allowing a specific resource server to fulfill the generic interface schema for a specific client.

The method may include defining, via the generic resource definition, contents of a successful response from the resource server to the service provider client upon successful authorization of access to the protected resource.

The protected resource may be a digital object which the resource server is operable to send to the service provider client on behalf of a resource owner.

The method may include storing, at the authorization server, a registry including any one or more of approved resources data, participant data, and capabilities data. The capability data may include capability data of the service provider client.

The method may include integrating directly from the service provider client to the generic resource definition at the authorization server; and providing access to one or more protected resources at one or more resource servers via a single authorization request issued by the service provider client.

The method may include granting, via the authorization server, access to a plurality of resource servers from a single client request.

The generic interface schema may be a generic API schema.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 15 is a flow diagram illustrating resource owner authentication, according to an embodiment;

DETAILED DESCRIPTION

Figure 1:
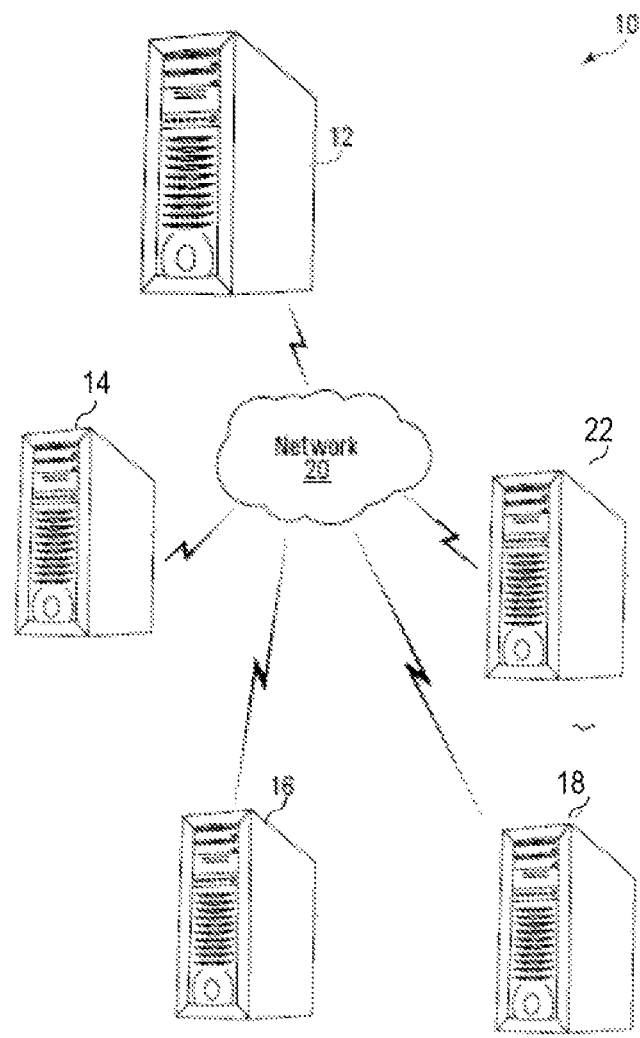
FIG. 1 is a schematic diagram of an identity and access management system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The present disclosure provides a distributed authorization system, and more particularly an authorization service that extends one or more public standards to federate trust between online service providers. The authorization service enables collaboration and data sharing between online parties with the consent of citizens.

Referring now to FIG. 1, shown therein is a block diagram illustrating a distributed authorization system 10, in accordance with an embodiment. The system 10 includes an authorization server platform 12, which communicates with a plurality of devices including an agent device 16 (also referred to herein as "agent", "digital wallet", "wallet", or "digital authenticator"), a client device 18, and a resource server 22 via a network 20. The system 10 also includes an identity provider device 14, which can communicate with the agent device 16 via the network 20.

In an embodiment, the client device 18 and resource server 22 are online service providers. The authorization server 12 and agent device 16 together provide an authorization service which can facilitate access by the client device 18 to a protected resource hosted by the resource server 22.

The server platform 12 and devices 14, 16, 18 and 22 may be a server computer, desktop computer, notebook computer, tablet, PDA, smartphone, or another computing device. The devices 12, 14, 16, 18, 22 may include a connection with the network 20 such as a wired or wireless connection to the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 20.

Input device may include any device for entering information into device 12, 14, 16, 18, 22. For example, input device may be a keyboard, keypad, cursor-control device, touchscreen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

Devices such as server platforms 12 and devices 14, 16, 18 and 22 can be described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platform 12. For example, a user using the device 18 may manipulate one or more inputs (e.g. a mouse and a keyboard) to interact with a user interface displayed on a display of the device 18. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive a plurality of information, from each of the plurality of devices 14, 16, 18, and 22.

In response to receiving information, the server platform 12 may store the information in storage database. The storage may correspond with secondary storage of the devices 14, 16, 18 and 22. Generally, the storage database may be any suitable storage device such as a hard disk drive, a solid-state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

In some embodiments, the distributed authorization system 10 includes a centralized resource definition manager module. An example of the resource definition manager module is illustrated as part of the distributed authorization system 2100 of FIG. 21, described below (resource definition manager module 2182).

The resource definition manager module, or a portion thereof, is located at the authorization server 12. The resource definition manager module includes one or more software components located at the authorization server 12 which are configured to provide one or more centralized resource definition management functionalities described herein. Such functionalities may include, for example, the generation, storage, and management of resource definitions, and the communication of data between system 10 components relating to resource definitions.

In some cases, the system 10 may perform authorization server discovery using the centralized resource definition (e.g. specification of data) held by the authorization server 12.

In some embodiments, the distributed authorization system 10 includes a distributed authenticator module. An example of the distributed authenticator module is illustrated as part of the distributed authorization system 2100 of FIG. 21, described below (distributed authenticator modules 2184, 2186). The distributed authenticator module may enable privacy-respecting resource server discovery by the system 10.

Figure 21:
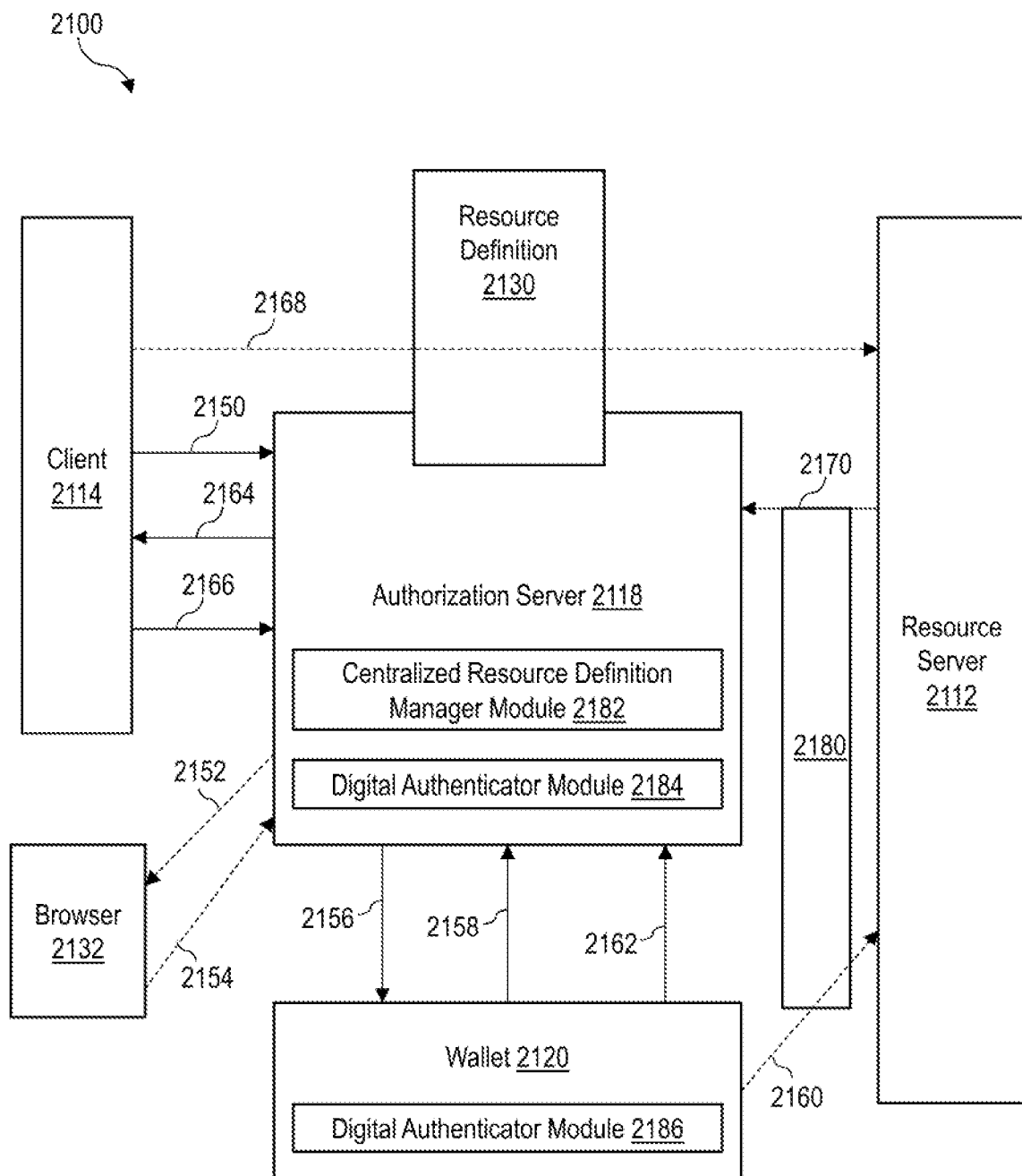
FIG. 21 is a block diagram of a distributed authorization system, according to an embodiment.

The distributed authenticator module may include authorization server-side software components located at the authorization server 12 and agent-side software components located at the agent device 16 (e.g. digital authenticator modules 2184 and 2186 of FIG. 21, respectively). The authorization server-side and agent-side software components can interact to provide one or more distributed authentication or privacy respecting features of the distributed authorization system 10 described herein.

One example of such a privacy respecting feature provided by the distributed authenticator module is controlling the types of data the authorization server 12 holds or to which the authorization server 12 has access. For example, the distributed authenticator module may be configured to prevent the authorization server 12 from acquiring or holding private, personal, or secret data of a user, such as private information or digital relationships.

The distributed authenticator module includes computer-executable instructions which may execute at any one or more of the authorization server 12, the agent device 16, and the identity provider device 14 in order to provide the distributed authentication and privacy-respecting functionalities described herein.

The distributed authenticator module may be configured to generate pseudo public key cryptographic identities and relationships that are verifiable but not identifiable on a public, private, central registry or distributed ledger.

The authorization server-side components of the distributed authenticator module may include a technical interface comprising an API for administration and the agent-side components of the distributed authenticator module may include a user interface for authorization policy. The user interface at the agent device 16 and the technical interface at the authorization server 12 may interact to provide a distributed authenticator functionality of the system 10.

The distributed authenticator module may advantageously provide multiple administration points (for example, via multiple different agents 16) providing a choice or agency with respect to wallet or distributed authenticator providers. This can provide an important separation which can prevent the authorization server 12 from owning the agency of all user participants.

The distributed authenticator module may advantageously split functions of a traditional authorization server (such as those used in existing authorization approaches) into two distinct roles, performed by the authorization server 12 and the agent device 16. As a result, the distributed authenticator module can enable a privacy respecting (zero-knowledge) authorization server 12 where pseudonymous public key cryptographic identities and relationships are verifiable but not identifiable on a public, private, central registry or distributed ledger.

In some embodiments, the distributed authorization system 10 enables an OAuth extension which allows a single call to result in connections to any number 'n' of protected resources which may be stored in a single resource server 22 or multiple (e.g. diverse) resource servers 22. In some cases, an OAuth call to a particular resource definition may result in 'n' returned tokens for a protected resource. The functionalities of the resource definition manager module may result in a one-to-many integration pattern among authorization server participants.

The system 10 may support access to and revocation of tokens for resources stored at the resource server 22. In some cases, the client 18 may be given a token per resource in the ticket. This may allow fine grained revocation of permissions and access to many resource servers 22 at once.

The client 18 may request access to the protected resource based on the generic resource definition. The client 18 can use the resource definition to make a request to access a protected resource stored by the resource server 22.

The system 10, including the centralized resource definition manager module, may facilitate integration to generic resource definition making resource server discovery dynamic.

Figure 2:
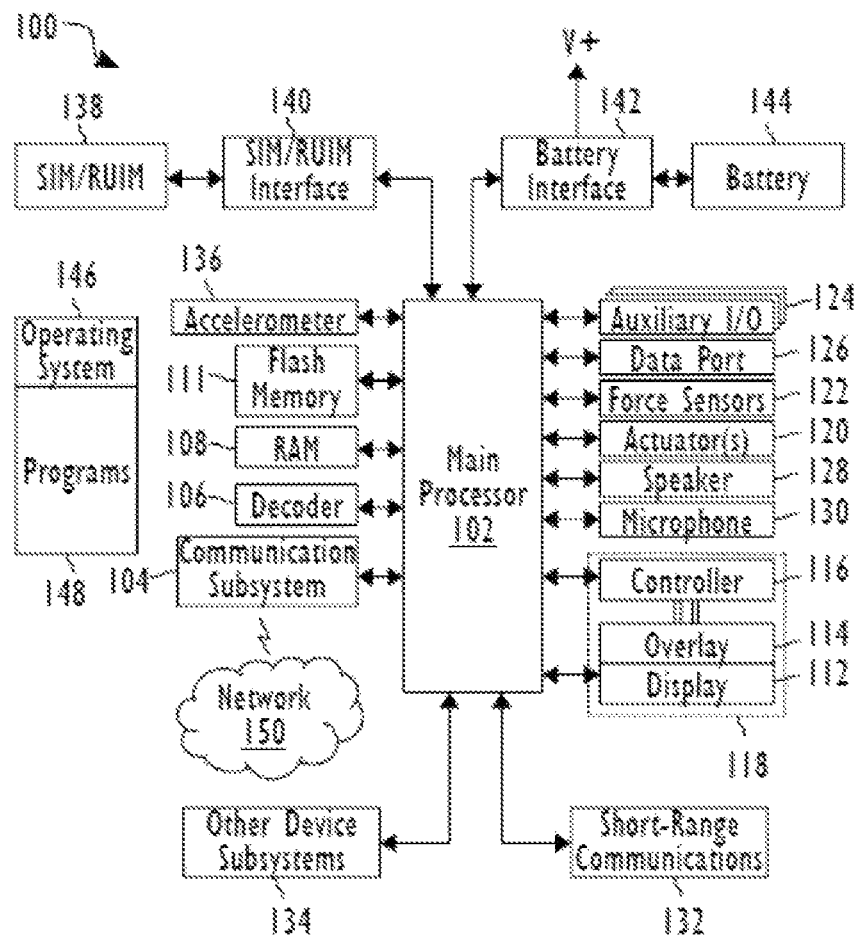
FIG. 2 is a block diagram of a computing device of FIG. 1, according to an embodiment.

In some cases, the distributed authorization system 10 may enable both resource server discovery and authorization server discovery processes Referring now to FIG. 2, shown therein is a simplified block diagram of components of a mobile device or portable electronic device 100, in accordance with an embodiment. The portable electronic device 100 may be any of the devices 12, 14, 16, 18, 22 of FIG. 1. The portable electronic device 100 includes multiple components such as a processor 1020 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The portable electronic device 100 may be a battery-powered device and as shown includes a battery interface 142 for receiving one or more rechargeable batteries 144.

The processor 102 also interacts with additional subsystems such as a Random Access Memory (RAM) 108, a flash memory 110, a display 112 (e.g. with a touch-sensitive overlay 114 connected to an electronic controller 116 that together comprise a touch-sensitive display 118), an actuator assembly 120, one or more optional force sensors 122, an auxiliary input/output (I/O) subsystem 124, a data port 126, a speaker 128, a microphone 130, short-range communications systems 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device generated by the processor 102 may be displayed on the touch-sensitive display 118.

The processor 102 may also interact with an accelerometer 136 as shown in FIG. 2. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150). Alternatively, user identification information may be programmed into the flash memory 1100 or performed using other techniques.

The portable electronic device 100 also includes an operating system 146 and software components 148 that are executed by the processor 102 and which may be stored in a persistent data storage device such as the flash memory 110. Additional applications may be loaded onto the portable electronic device 1000 through the wireless network 150, the auxiliary I/O subsystem 124, the data port 126, the short-range communications subsystem 132, or any other suitable device subsystem 134.

In use, a received signal such as a text message, an e-mail message, web page download, or other data may be processed by the communication subsystem 1040 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. The speaker 128 may output audible information converted from electrical signals, and the microphone 130 may convert audible information into electrical signals for processing.

The present disclosure provides a federated privacy exchange ("FPE" or "FPX") platform. The language used herein is generally consistent with User-Managed Access (UMA).

The FPE specification extends UMA to address privacy protecting legislation such as the EU General Data Protection Regulation (GDPR).

Central to the UMA legal framework is a resource owner's (RO) appointment of an authorization server operator (ASO) as a contractual and licensing agent.

The authorization server operator is responsible for establishing and enforcing the resource owenr's access and sharing policy conditions with respect to personal data and informational rights. This document uses the term "personal data" as it is defined in the GDPR (EU-REG-2016/679). Under this definition, "personal data" is any information relating to an identified or identifiable natural person. This concept of personal data includes the less broad concept of personally identifiable information (PII), common throughout North America The federated privacy exchange and distributed authorization systems provided herein extend this model through the introduction of an agent (or digital wallet) role (e.g. agent device 16 of FIG. 1).

All personal data is handled by the agent, which may allow for greater control by the resource owner in terms of securing and restricting personal data to a trusted environment. The authorization server operator is unburdened from managing sensitive private data, while an authorization server (e.g. authorization server 12 of FIG. 1) is tasked to manage network resource model and membership information.

An identity provider (IDP) is another new role introduced by the federated privacy exchange of the present disclosure.

In an embodiment, the IDP authenticates the resource owner and issues an assertion and basic user data to the agent. The authorization server operator defines the group of approved IDPs to create basic criteria for resource owner participation with the federated privacy exchange instance. The IDP is shielded from disclosing user data to the authorization server by only interacting with the agent, while the authorization server can still verify the assertion.

Privacy protecting legislation focuses heavily on ensuring that user/citizen consent is made transparent and enforceable. The federated privacy exchange specification positions user consent as a core tenant, where resource owners are able to control all aspects related to their brokered identity data transactions. Resource owners are empowered with choice in terms of agent, identity provider and attributes, and can invoke/revoke consented items according to their preferences. Importantly, the logged history of consented identity transactions may be housed in a distributed ledger for immutability and encrypted in pseudo-anonymous data formats. As a result, the federated identity model can guarantee the level of trust and proof of transaction required to sustain business and legal requirements.

Introduction of the identity provider and agent roles enables the authorization server to offer a flexible deployment model for identity services which can be tailored to meet specific business requirements and use cases. Through the implementation of governance rules, the authorization server operator can, for example, enable a very closed environment in which the pool of resource owners and identity providers are minimized in order to limit the scope of authorized identity transactions. This centralized model positions the authorization server operator in a more controlling role, applicable to closed environments with a limited number of actors and identity attributes.

The federate privacy exchange specification also allows for a decentralized approach to federated identity brokering in which governance rules are less rigid and resource owners are offered greater choice with a variety of options. In this framework, multiple agents could be operating and selected by the resource owners depending on their needs and preferences with respect to the intended access or consumption of specific services. Through an agreed vetting process, a governance committee could enable dynamic addition of new resources onto the network and enable the ability to federate across federated identity domains (i.e. linking of authorization server operators). An open model of federated identity brokering may also enhance competition at the role level, yielding more efficient and optimized outcomes to the benefit of all parties, specifically the resource owner.

Federated privacy exchange-based solutions offer industries the ability to provide identity services according to specific use cases where user journeys are defined by the governance committee according to agreed terms and conditions of an underlying purpose-driven implementation. Industries such as healthcare, banking, insurance, and auditing are examples in which federated privacy exchange-based solutions may enable a modern identity overlay and transition services without the need to deprecate legacy siloed systems.

Federated identity brokering, as described herein, can also be relevant to industries in which the identities that require assertion and proofing are based on "things" rather than users or citizens. IOT devices, AI communication bots, and many other non-human actors are creating value across different—and in some cases entirely new—marketplaces. Interaction and communication with these devices to control and access data are contingent on the ability to securely manage their identities and the permissions associated with relevant stakeholders in their ecosystem. Although identity credentials for things may differ from those for people, the process of using an agent to leverage trusted identities through interaction with identity providers would follow a similar pattern.

Domain Introduction

User-managed access ("UMA") is an OAuth-based access protocol which allows resource owners to federate granting access to their resources to a centralized authorization server. Clients are able to asynchronously request these resources on behalf of a requesting party (RqP) once the resource owner has authorized access through the policies they set at the authorization server.

The authorization server is used by a client application and requesting party to receive access to a protected resource server (RS) with the resource owner's consent. UMA allows for complete, resource owner-directed federation between those requesting resources (clients) and those providing resources (resource servers). The central component of UMA is the authorization server which mediates between the participants.

Figure 3:
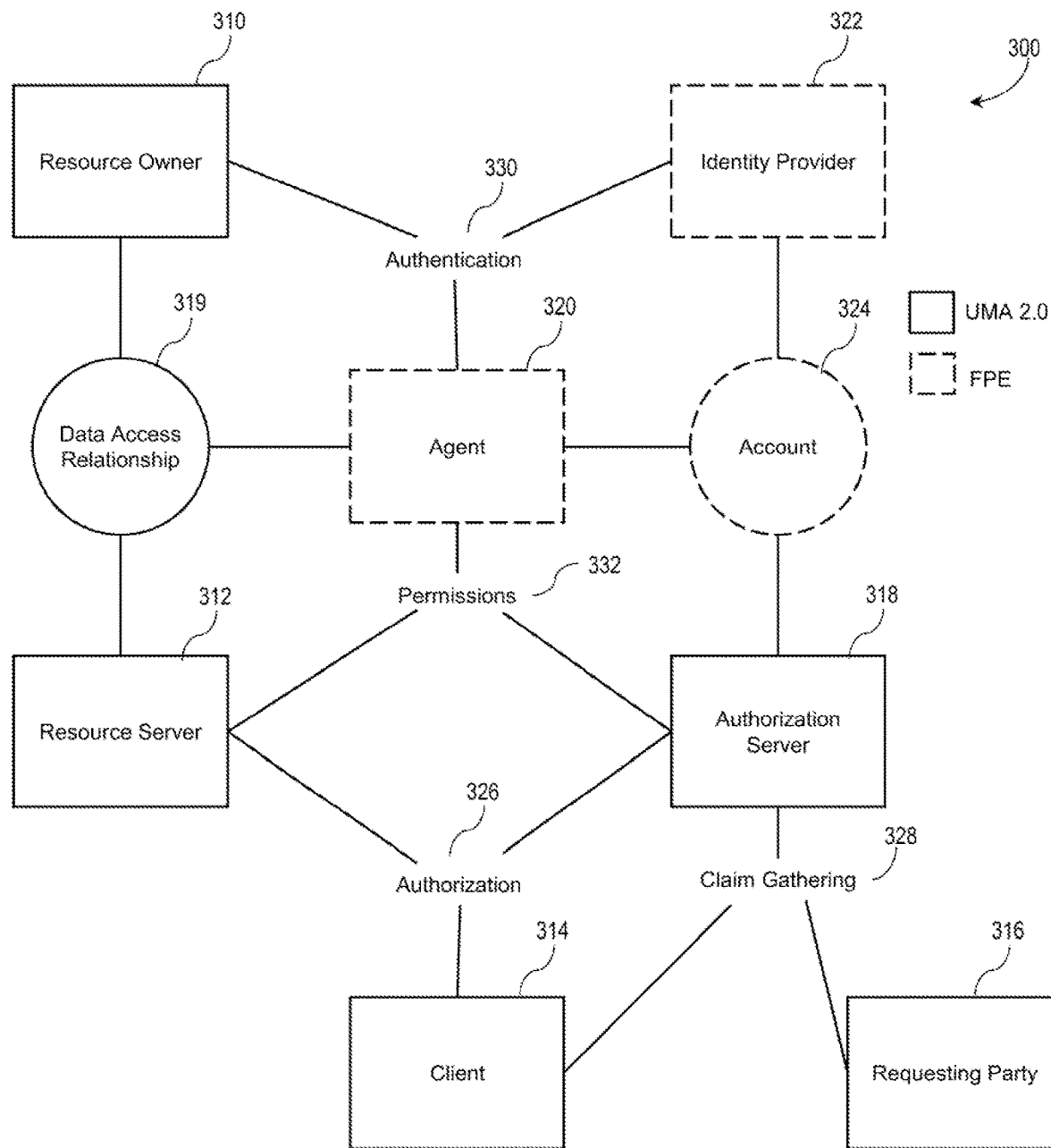
FIG. 3 is a block diagram of a distributed authorization system including a federated privacy exchange (FPE) extension to the UMA federated authorization flow, according to an embodiment.

Referring now to FIG. 3, shown therein is a distributed authorization system 300, according to an embodiment. The system 300 includes a federated privacy exchange (FPE) extension to the UMA federated authorization flow.

The system includes UMA 2.0 components and federate privacy exchange components integrated with the UMA 2.0 components. The UMA and federated privacy exchange components can also be considered "roles" within the system 300 that are performed by certain entities and devices.

The system 300 include a resource owner (RO) 310, a resource server (RS) 312, a client 314, a requesting party 316, an authorization server 318, and a data access relationship 319.

The authorization server 318, client 314, and resource server 312 collaborate over authorization 326. In particular, the authorization server 318 issues the authorization 326, the client 314 needs the authorization 326 (to access resources at the resource server 312), and the resource server 312 trusts the authorization 326.

Claims gathering 328 is an UMA term for sending the requesting party 316 to the authorization server 318 to gather information about the requesting party 316 in order to determine what authorization can or should be issued to the client 314.

Using the FPE of the system 300 (versus a pure OAuth/UMA implementation), the FPE supports authorization 326 to multiple resource servers 312 through one flow. An access token in the system 300 includes multiple resource server constrained tokens.

Claims gathering 328 has the authorization server 318 delegate to the agent 320. The agent 320 presents an end user interface. This can be contrasted with claims gathering in OAuth/UMA, which is open.

FPE-specific components include an FPE agent 320 (or simply, agent 320) and an identity provider 322.

The system 300 includes an account 324.

The account 324 is an actual record created through transaction involving the authorization server 318, the agent 320, and the identity provider 322.

The account 324 is based on an identity provider account controlled by the agent 320 and registered with the wallet.

The user needs an account 324 with the authorization server 318 before the user can create permissions 332.

The permissions 332 represent consent of the resource owners to give a client 314 authorization. The permission 332 uses an account and data access relationship (e.g. data access relationship 319). An example of such a relationship may be that a user (resource owner) with an authorization server account number 84329 permits a client C to access a resource R of the user from resource server 57 using the user's data access relationship 57100.

The system 300 includes differences when compared to pure OAuth/UMA solutions, with respect to accounts 324 and permissions 332.

For accounts, in OAuth, the identity provider is usually the authorization server and the authorization server/identity provider entity is fully maintaining, controlling, and holding the account. In UMA, the authorization server trusts accounts registered at separate identity providers.

Using the system 300 (and the FPE), the account 324 is still registered with the authorization server 318, but the authorization server 318 does not have a direct relationship with the identity provider 322, as this is brokered by the agent 320. This configuration allows the authorization server 318 to not have access to personal data from the identity provider 322 (in a provable manner). The account 324 can be augmented with a new keypair controller by the user at the agent 320. The keypair can be used to authenticate against the account 324 without requiring the user to log in to the identity provider 322 again.

For permissions, all OAuth systems have a concept of permission or granted policy. These permissions correspond to what the authorization server will issue as authorization to the client. Core UMA follows a 'set math' type of permission assessment.

While in some cases the system 300 may perform similar or the same permission assessment steps, the permissions 332 in system 300 are not against a resource owner 310-specific resource registration. To stay privacy-respecting at the authorization server 318, resources are registered in the abstract (abstract definition of resource) and the permission 332 references the abstract definition. The system 300 leaves it up to the resource server 312 to map the abstract definition to the specific resource owner resource.

The specification implemented by system 300 extends UMA to allow distributed and privacy respecting operation of the authorization server 318, enforce federated registration of resource owners 310, and allow governance of network participants and their capabilities.

The authorization server 318 enables privacy respecting operation through the use of the agent 320.

The agent 320 presents a user interface used to interact and manage an account with the authorization server 318, which may include secrets and personal information. Therefore, the authorization server 318 only receives identifiers and data controlled by the resource owner 310. The authorization server 318 never learns identifiable information about a resource owner 310. The resource owner 310 cannot be traced between interactions unless explicitly permitted. Since all data seen by the authorization server 318 is public, the separation of responsibility allows the authorization server 318 to be run in a distributed manner between untrusted participants who share a public ledger (such as a blockchain).

Authorization server account registration (account 324) is facilitated by the agent 320 on behalf of the resource owner 310.

Registration is accomplished by acquiring an identity assertion from a trusted identity provider 322. The identity assertion is bound, without personal information, to an authenticator (not shown) supported by the authorization server 318.

After the authenticator is registered, the resource owner 310 may authenticate to their account and control their client permissions.

The federation to an identity provider 322 allows a system operator to indirectly control the population of users on the system 300.

The agent 320 also helps the resource owner 310 establish and maintain relationships and rights to resource servers 312.

The resource owner 310 first interacts with a resource server 312 to determine which resources the owner 310 has rights to access (e.g. data access relationship 319).

Afterwards, the resource owner 310 may use the relationship 319 to create permissions 332 for clients 314 to access data from the resource server 312.

Although permissions 332 are recorded at the authorization server 318, the data contained is only meaningful to the resource owner 310 and resource server 312 based on information establishing earlier during this relationship.

The authorization server 318 may also represent a trusted community of approved participants. The explicit approval of client capabilities, tied to a purpose, makes a user's choice much more transparent. The governance of the authorization server 318 allows the user to have better insight into who their data will be shared with and how their data may be used. This also allows level of assurance (LOA) to be included as a top-level concept. Tagging data with LOA, both at the requester 316 and provider 322 side, ensures that clients 314 receive data of sufficient quality to complete their workflow while preventing poor resource servers 312 from polluting the space. The registration of client 314 and resource server 312 capabilities also avoids tokenless authorization requests from the client 314 to the authorization server 312.

Motivating Scenario

The federate privacy exchange enables digital assets to be shared in a secure, privacy preserving way between a wide assortment of parties without requiring individual integrations between parties. This configuration can provide a level of convenience for sharing personal data that has previously been difficult to achieve.

Operators of a federated privacy exchange enable a wealth of use cases and solve a wide range of current problems centering around identity and data security. Each implementation may allow many different participants to act as identity providers 322, resource servers 312, and service providers (SPs) (i.e. clients 314), with dynamic roles allowing for the same participant to act alternately as an identity provider 322, service provider, or resource server 312 as needed.

One example of a federated privacy exchange implementation is a Local Health Region that chooses to establish a federated privacy exchange for their community.

The local hospital can build a digital registration flow that lets a community member register while simultaneously creating a digital identity. With an established digital identity, and the help of an agent 320, any given community member may choose to interact with their care providers, services, or tools, while remaining in control of their personal data. A clinic may request access to a health record and, with the consent of the patient, receive access with more speed and ease than is currently possible. A patient may log into a third-party app using their digital identity and then choose to give the app access to their immunization records in order to check and manage their personal immunizations. Care providers in the community, like physiotherapists or home-care nurses, may also be enabled by federated privacy exchange to collaborate with others through assertions facilitated by federated privacy exchange.

Strengths of the federated privacy exchange solution may include its flexibility and interoperability, allowing many participants to share and collaborate with essential data privacy and security guaranteed.

The federated privacy exchange acts as a fabric to allow a community of clients 312, resource servers 312, and agents 320 to collaborate without advanced knowledge of each other and only at the direction of the user.

Federated privacy exchange may also enable a spectrum of operating modes, both in terms of the number of approved participants, and also the governance requirements to become a participant. For example, federated privacy exchange may be operated as completely open, where any entity may register to fulfill any role. In contrast, federated privacy exchange may be strongly governed, where each participant must agree to the operator's terms of service (TOS) and comply with ongoing conformance and audit processes.

Levels of Assurance

In federated privacy exchange, level of assurance (LOA) becomes a first-class concept. Through governance, the federated privacy exchange operator is free to define the meaning and criteria of each level.

In general, LOA can be numerically ordered. In federated privacy exchange, a LOA is combined with a resource to become a capability or requirement. For example, "my bank can provide first name at LOA3, which will satisfy the requirements of my Gym membership". Federated privacy exchange governance and workflows ensure appropriate LOA semantics and permit configuration of thresholds.

Note: The National Institute of Standards and Technology (NIST) SP 800-63 separates LOA into Identity Assurance Level (IAL), Authenticator Assurance Level (AAL) and Federation Assurance Level (FAL). The network operator can still evaluate and set criteria in these terms since there is clear definition of authenticator and federating parties. In this sense, federated privacy exchange LOA most closely resembles NIST IAL in that it typically defines a trust in the identity of the resource owner of which the data is being presented.

System Roles

Referring still to FIG. 3, as described, the system 300 includes an agent 320. The agent 320 includes an interface (e.g. user interface) for the resource owner 310. The user interface of the agent 320 can be used by the resource owner to manage credentials and control permissions and policies at the authorization server 318. In some embodiments, the agent 320 may be configured to perform agent-to-agent interaction with another agent to allow the resource owner 310 to delegate access to the protected resource. The resource owner may delegate access to the protected resource directly via the agent-to-agent interaction. In some embodiments, the agent 320 may be configured to connect directly to the resource server 312 based on a mutual registration at the authorization server 318.

As described, the system 300 includes an identity provider 322.

The identity provider 322 acts as a federated gatekeeper to an account at the authorization server 318 and exposes any personal information only to the agent 320.

As described, the system 300 includes an authorization server 318.

The authorization server 318 is the main transaction mediator and federation point in the system 300.

The authorization server 318 maintains record of both the operator-defined entity membership and capabilities, and the privacy-respecting account and user policy data.

As described, the system 300 includes an authorization server operator or ASO (not shown in FIG. 3).

The authorization server operator is the operator administering the authorization server 318 to define the protected resources, approved participants, and participant capabilities.

As described, the system 300 includes a resource server 312.

The resource server 312 holds protected resources on behalf of the resource owner 310.

The resource server 312 responds to valid disclosure requests created by the resource owner 310 and presented by the authorization server 318.

As described, the system 300 includes a client 314.

The client 314 needs resources related to the requesting party 316 to perform a service.

The client 314 registers capabilities with the authorization server 318, which can be requested at a later time.

As described, the system 300 includes a resource owner 310.

The resource owner 310 is the principal actor on the system 300.

The resource owner 310 has rights over resources at resource servers 312 and can get an assertion from an approved identity provider 322.

As described, the system 300 includes a requesting party 316.

The requesting party 316 is the actor engaged with the client 314.

The client 314 requests resources on behalf of the requesting party 316.

When the requesting party 316 is transitioned to an agent 320, the requesting party is called the resource owner 310.

Figure 4:
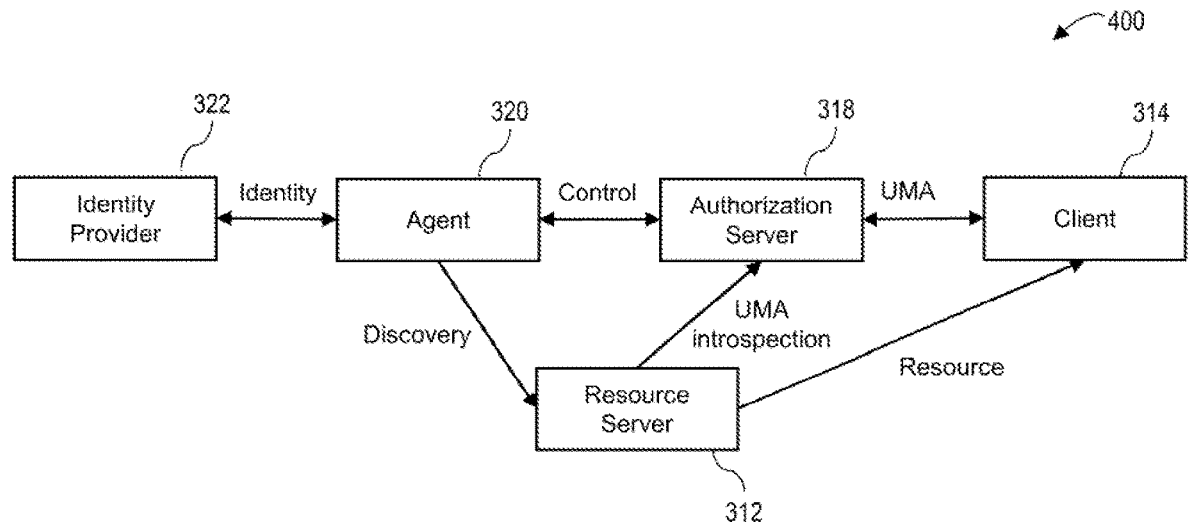
FIG. 4 is a block diagram of a component architecture of the FPE of FIG. 3, according to an embodiment.

Referring now to FIG. 4, shown therein is a federated privacy exchange component architecture 400, according to an embodiment.

As shown in FIG. 4, the agent 320 communicates with the identity provider 322 to add levels of control into the network.

The agent 320 provides the user interface which can be used by the resource owner 310 to manage interactions with the authorization server 318.

This interface acts in a trusted role, allowing the authorization server 318 to remain privacy-respecting.

Main responsibilities of the agent 320 include providing a consistent user experience to the resource owner 310, helping hold secret or personal data, and interacting with other systems on behalf of the resource owner 310.

The agent 320 is comparable to a "wallet" in a blockchain system.

The agent 320 is also responsible for providing resource owner 310 account recovery and transfer/export to another agent. This provides the resource owner 310 with freedom to change agents 320 or move capabilities between agents 320.

Many agents 320 may act on the network, as determined by the authorization server operator. This can provide the resource owner 310 with a choice of agent 320.

Agents 320 may be differentiated to the user by factors such as security posture, user experience or community support, or other considerations. A common UI and interface can simplify the journey of the resource owner 310, which also benefits the agent 320 since the agent has a greater opportunity to interact with the user.

Referring again to FIG. 3, the system 300 may enable users to independently hold and control verifiable digital credentials issued by local and national identity programs. These credentials are principally used with local services, while interoperating with many national or global verification platforms. The systems and methods may create a path for established API-based identity programs (e.g. OAuth/OpenID Connect [OIDC]/User Managed Access [UMA] providers) to also support this self-sovereign identity architecture.

In an embodiment, the system 300 can be designed foremost to protect the person's privacy and identity. This may be achieved technically through layered controls such as user-chosen peerwise pseudonyms, registration of organizations in a community authorization server (e.g. authorization server 318 of FIG. 3), an independently user-controlled wallet (e.g. agent 320 of FIG. 3), and potential designation of the issuer as a holder.

The system 300 may use existing web authorization protocols to support the issuance and presentation of W3C Verifiable Credentials (VC) in the JSON-LD format. Through the use of W3C DID standards for identifier establishment and resolution, the system 300 may remain independent of a single central registry.

The system 300 may demonstrate the feasibility of the DID & VC by using the Hyperledger (HL) Indy and HL Aries software. Additional interoperability may be provided by creating a DID method backed by a traditional database and deployment of a second HL Indy instance. This may require that issuers and verifiers resolve identifiers against several registries.

The system 300 may allow existing OAuth identity and data providers to interoperate with this verification platform for either VC or API-based credential issuance and presentation. The system 300 may, for example, manage issuers of identity and healthcare data. This may include VCs containing high-value healthcare data such as immunization records, blood type, and organ donor directives.

In an aspect, the system 300 may center around the Person. The system 300 may be designed to actively promote the privacy, agency, and safety of the Person using digital credentials. The model implemented by the system 300 may define the necessary roles and motivations to achieve a trustworthy and interoperable credential verification and data economy.

The system 300 may empower independent communities to provide oversight of a participating organization's reputation, capabilities and conformance to applicable policy. This community model may maximize the choice for people and minimize the integration effort of organizations. The system 300 may scale to operate locally, nationally, or globally by requiring shared standards for both identity assurance and data formats.

The Hyperledger Aries group has identified that a self-sovereign ecosystem should be established at 4 levels: (1) identifier choice, (2) connection and authorization protocol, (3) interoperability of credentials, and (4) governance. The HL Aries and Indy projects provide the technical implementation of 1, 2, and 3. However, these technologies do not address the trust framework in the policy and community space (4). This final element addresses fundamental questions about the trustworthiness and capabilities of different organizations operating in the credential ecosystem.

The system 300 includes three main actors: the issuer (e.g. resource server 312 of FIG. 3), holder (e.g. agent/wallet 320 of FIG. 3), and verifier (service provider). The VC standard also includes a registry of self-controlled identifiers and public keys. This registry is a technical artifact, and different implementations offer additional features (e.g. revocation on HL Indy.)

The system 300 introduces a new role, a community authorization server (e.g. authorization server 318 of FIG. 3) to deliver level 4 (governance). The authorization server 318 may provide a directory of organizational participants and their approved capabilities for identity assurance, data issuance, and data access. The authorization server 318 supervises ecosystem participants and remains independent from data. The authorization server 318 defines a data interoperability model required to scale globally. The authorization server 318 role does not receive personal data and is incentivized to serve the community, including both people and organizations.

The system 300 may give issuers and recipients ownership of their official records that can be cryptographically signed and presented anywhere to verify credential provenance and ownership.

The system 300 may give issuers and recipients autonomy over how they use their records and verify digital credentials. For example, if issuers decide to switch vendors later, the issuers retain full access and use of their digital certificates.

The system 300 may give relying trusted third parties the ability to verify a record independently, for free and independent of a software vendor or issuing institution. Relying parties can verify a digital credential through widely available technology such as a web browser or a mobile phone. Verification is based on open and interoperable approaches.

The system 300 may provide leading-edge digital credential security to enable the global trust economy that are cryptographically signed, which can enable third parties to verify their provenance and ownership.

The system 300 may demonstrate the components of self-sovereign identity including decentralization and portability, demonstrated control of attributes, and independence from a centralized registry, identity provider, or certificate authority.

In an embodiment, the system 300 uses the VC data model to demonstrate issuance and ownership credentials, cryptographically signed by the issuer and holder, respectively. Issued credentials can be verifiably linked to the issuer's public registered DID. On presentation, the holder proves cryptographic control of the identity to which the credential was issued. The ownership and provenance requires strong key management practices by both the issuer and wallet 320, which conforms to standards established at an authorization server 318.

The VC model and the wallet software may allow the holder to autonomously generate a credential presentation for any third party, without the issuer having knowledge of its usage. A verifier that received a credential presentation can re-verify at any time. The system 300 may use HL Indy to show that DID registries may support issuer revocation, however this feature depends on extended validation by the verifier.

The system 300 may give third-party verifiers the ability to verify the integrity of a presented credential at any time, using open source software such as HL Aries, HL Ursa, and/or OpenSSL. The VC model references the verification protocol to follow with cryptographic software. Signature verification is very accessible and widely used with many software implementations.

The system 300 considers a credential's security through its entire lifecycle, especially as the credential moves between systems. The system 300 may provide cryptographic security using both EC signatures, RSA signatures, and Zero-knowledge Proofs (ZKP.) The ZKP credentials, which may be implemented through HL Aries integration, represent a leading edge for privacy respecting cryptography with the property of proof without disclosure. Signature types demonstrate credential provenance and ownership from issuer through verifier.

Self-sovereign identity may be directly demonstrated by the system 300. The system 300 may be decentralized at all levels, allowing for multiple competing or collaborating participants and communities. The user has agency over identifiers, any issued credentials with associated attributes, and their interactions with services. The system 300 may provide independence from any single identifier registry through use of DID standards.

The system 300 may be configured to provide registration of issuers (e.g. resource server 312) to the ledger and authorization server 318, issuance of credentials to the wallet software (agent 320), presentation of credentials back to the issuer (resource server 312) to authenticate to an account, and revocation of an issued credential.

In some cases, a raw HL Indy credential format may be transformed to support the W3C standard VC data model. For example, credentials from different DLTs may interoperate if the verifier is capable of resolving DID Documents from the issuers' identifier registry. This capability may be implemented within a core HL Aries implementation. In some cases, the system 300 may include credential capabilities, both for an issuer and verifier, which are recorded in the authorization server 318, and the wallet (agent 320) may read the approved capabilities when presenting a credential proof request to the end user.

Existing technical standards do not address scalability or conformance to regulatory policy and frameworks. Global adoption is hindered by models that center trust around the issuer and lack of data interoperability standards.

In an embodiment, the system 300 composes the OAuth, DID and VC standards to deliver a scalable credential ecosystem that can support emergent VC providers. The system 300 may use OAuth/UMA as the authorization pattern, enabling API authorization and static VC credential presentation. API authorization may conform to the requirements of open banking, healthcare innovation, digital governance, and ISO mobile drivers licenses.

The system 300 includes integration to a data profile at the authorization server 318, instead of directly to an issuer. The authorization server 318 provides a data standardization point such that the meaning of attributes is shared by all parties, which may significantly reduce integration effort for a verifier and usability by the person. The data profile builds on the resource and scope concept from OAuth2, and attributes in the VC model. Neither of these technologies generally associate scopes to a global meaning.

Data profiles and participant registration may directly create a distributed reputation model for issuers, wallets, and verifiers. Organizations can build reputation as they participate with more authorization servers 318 and are approved against data profiles. The VC model does not tie capabilities to either the issuer or verifier. Users may more safely participate knowing that data requests have been reviewed by a trusted authorization server 318 community. Further, registration of wallet vendors and providers is practically required. This is the highest trust role and uses independent accreditation of security and business practices.

The data profile and reputation together position the solution to scale from local to global communities. Setting data standards and promoting user agency may allow many communities to establish congruence of data and policies.

The system 300 may provide spillover benefits such as organizational enhancement of capabilities in the field(s) of privacy and cryptographic identity and consent.

The system 300 may provide scalable solutions that enable citizens to accomplish a number of transactions online with a high degree of trust and privacy, which can translate into new services, solutions, and wealth creation.

The system 300 may have application in numerous industries, ranging from healthcare through to open banking, industrial manufacturing, and travel.

Figure 5:
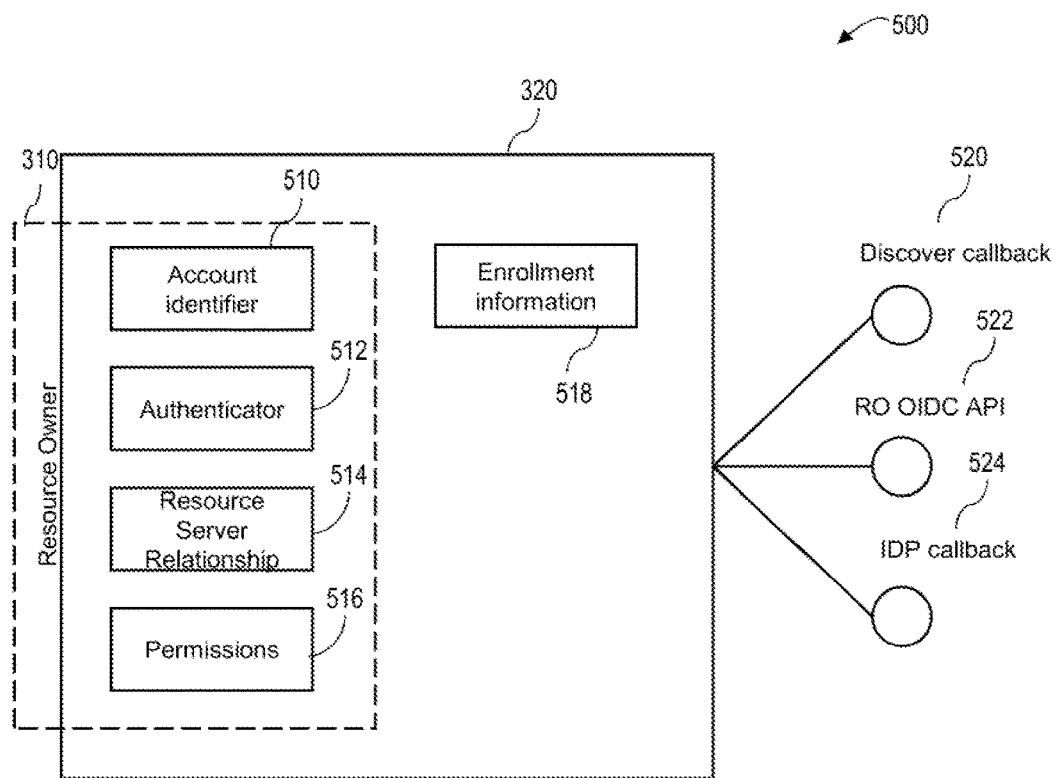
FIG. 5 is a block diagram of agent data storage and interface requirements, according to an embodiment.

Referring now to FIG. 5, shown therein are agent data storage and interface requirements 500, according to an embodiment.

The agent 320 and resource owner 310 are jointly responsible for holding protected data.

The protected data includes account identifier data 510.

The account identifier data 510 includes an account identifier of the resource owner's account at the authorization server 318. The agent 320 presents account identifier 510 during authentication.

The protected data includes an authenticator 512.

The authenticator 512 is a credential bound to an account at the authorization server 318 level. The authenticator 512 is used to respond to authentication challenges issued by the authorization server 318.

The protected data includes resource server relationship data 514.

The resource server relationship data 514 describes resource server 312 relationships which are used by the resource owner 310 to create permissions for clients 314 to access resources. These relationships are created by direct interaction between the resource owner 310 and the resource server 312.

The protected data includes permissions data 516.

The permissions data 516 comprises a list of permissions created by the resource owner 310. These permissions 516 can be transient but are recorded to maintain the ability to revoke access.

The division of these data elements 510, 512, 514, 516 between the agent 320 and resource owner 310 in large part determines the security of the agent 320 and self-sovereignty of the resource owner 310.

The agent 320 also maintains OpenID Connect (OIDC) provider information to handle client authorization requests from the authorization server 318, an identifier and key set to allow the authorization server 318 to identify and verify agent-issued data, and a list of authorization client credentials for this process. The agent 320 may be an OAuth/OIDC client to many parties. This information includes its client ID and credential which can be used to get authorization to access other systems such as the identity provider 322, resource server 312, and authorization server 318.

The agent 320 is a mediator for the resource owner 310 and, in addition to the resource owner 310 user interface, is configured to present one or more technical interfaces to other entities.

The agent 320 can act as an OpenID Connect Relying Party (OIDC RP) to both the identity provider 322 and resource server 312. After the identity provider 322 and resource server 312 make authentication decisions, the agent 320 receives a callback with an authorization grant. The callback may be facilitated by the IDP callback 524 and discover callback 520 for the IDP and resource server OIDC relationships, respectively.

The agent 320 acts as an OIDC provider to the authorization server 318. When a client 314 request is received by the authorization server 318, the authorization server 318 delegates the permission gathering and authentication to the agent 320 and resource owner 310. This may be facilitated by the RO OIDC API 522.

The agent 320 also provides a user interface (not shown in FIG. 5) to the resource owner 310. The user interface is configured to allow a user to do any one or more of register new accounts, authenticate to their account, interact with the authenticator, manage permissions, and handle client resource requests.

Figure 7:
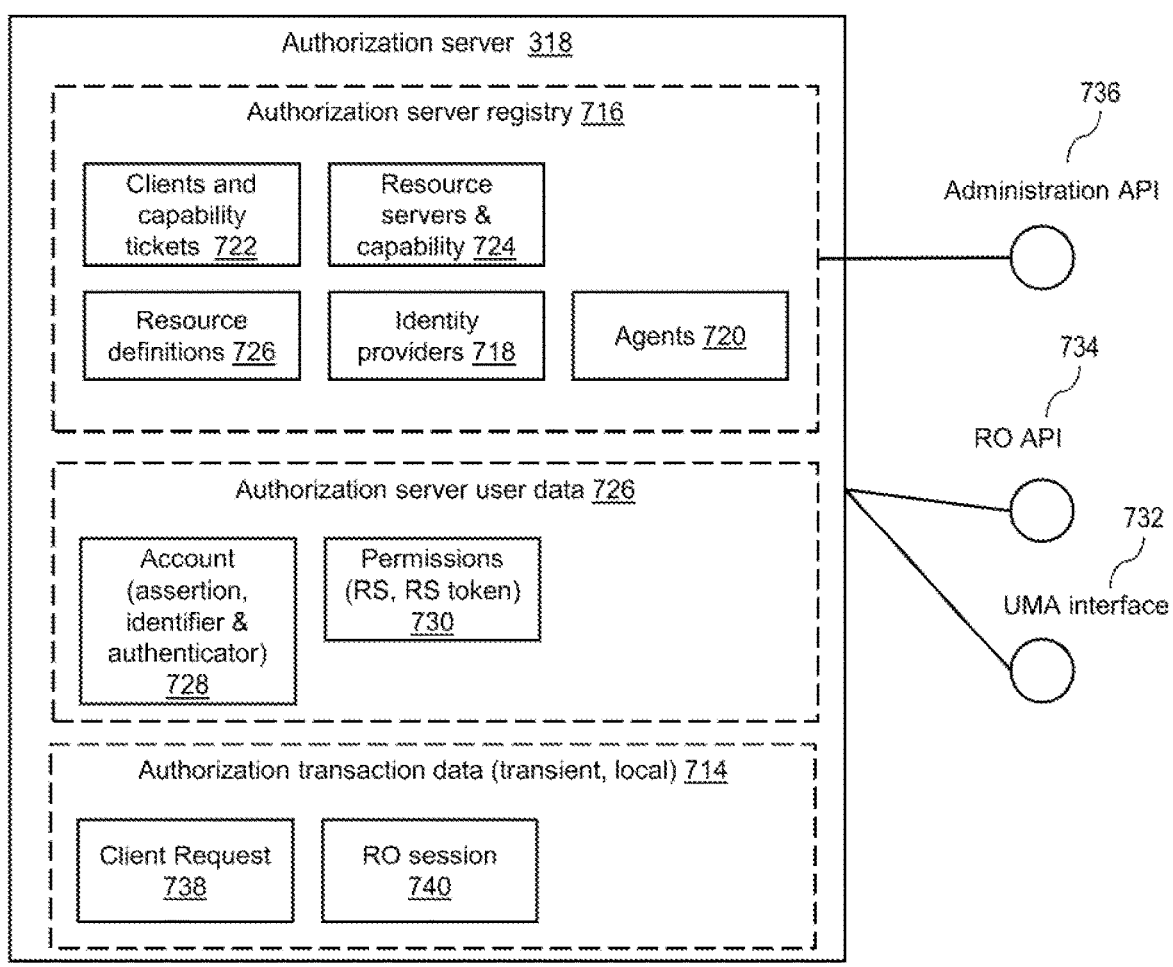
FIG. 7 is a block diagram of authorization server data storage and interface requirements, according to an embodiment.

The identity provider 322 is gatekeeper for a resource owner account at the authorization server 318 (e.g. account 510 of FIG. 5). The account 510 at the wallet 320 and account 728 of FIG. 7 are both created based on a login at the identity provider 322.

To create an account 324, the resource owner 310 first authenticates themselves to an approved identity provider 322. This ensures resource owners 310 come from an approved population of entities, verified by identity providers 322. The identity provider 322 is a special type of resource server 312 with a mechanism to authenticate resource owners 310 and issue their initial identity assertions. The mechanism may be strong and approved. The system 300 may operate with any number of identity providers 322 to access different resource owner 310 populations.

Figure 6:
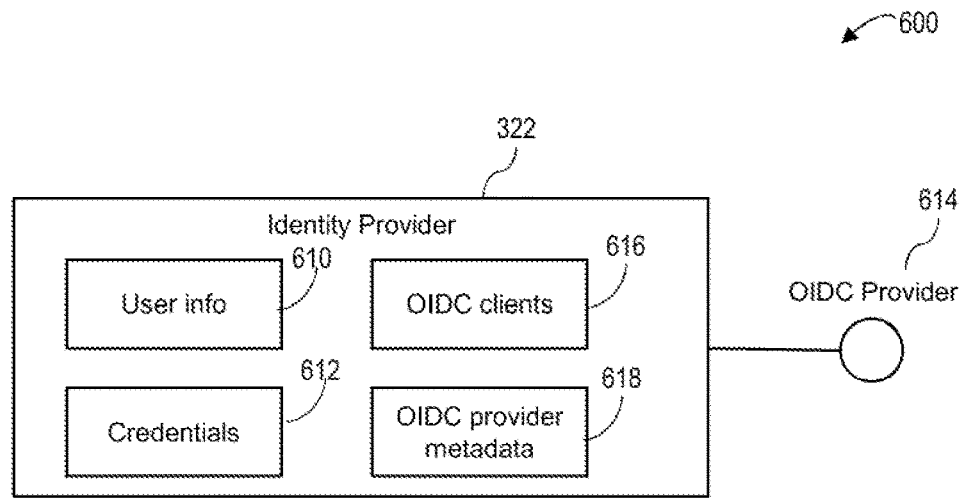
FIG. 6 is a block diagram of identity provider data storage and interface requirements, according to an embodiment.

Referring now to FIG. 6, shown therein are identity provider data storage and interface requirements 600, according to an embodiment. FIG. 6 shows the relationship between the OIDC and the user data elements within the identity provider 322.

The identity provider 322 stores identity provider user data. The identity provider user data includes user information data 610 and credentials data 612.

The user information data 610 includes basic identity information about the resource owner 310. The user information data 610 may include some combination of nickname, name, email, date of birth, and phone number.

The credentials data 612 is used by the resource owner 310 to identify their account 324. The resource owner 310 holds the secret authentication information to prove ownership of the credentials.

The identity provider 322 exposes an OIDC provider interface 614 to the agent 320.

The OIDC clients 616 and OIDC provider metadata 618 are standard data elements that an OIDC provider maintains. The clients 616 represent a list of OAuth clients which are allowed to connect and request user authentication. The metadata 618 defines the specific OAuth/OIDC flows, endpoints, and extensions that the identity provider 322 can perform.

The authorization server 318 is a mediator between all other participants. The authorization server 318 provides a privacy respecting ledger of resource owner accounts and permissions, presents the UMA interface to the client 314, and maintains transient transaction data.

The authorization server 318 may be operated in a distributed manner between many instance operators and may use distributed ledger technology to ensure data consistency and create trust between network peers.

Referring now to FIG. 7, shown therein are authorization server data storage and interface requirements 700, according to an embodiment.

The authorization server 318 maintains three classes of data including network metadata 710, resource owner data 712, and transient transactional data 714.

Network metadata 710 will now be described. The principal entity in the network metadata 710 data class is the resource, which defines the capabilities a resource owner may leverage. A resource is any digital object that a resource server 312 can send to a client 314 on the resource owner's behalf; for example, an attribute (name, date of birth) or access to data (immunization records).

As shown in FIG. 7, an authorization server registry 716 (the Registry), maintains a list of all approved participants and their capabilities.

IDPs 718 are registered with the maximum LOA that they may issue, based on an assessment by the network operator/governance rules.

Agents 720 are registered with their OIDC provider information. This is how the authorization server 318 delegates authentication upon receiving a client ticket request.

Clients 314 are registered with a client ID (e.g. OAuth 2.0 client ID), a secret, and a list of tickets. A ticket includes an identifier and a list of resources, each at a specific LOA. The ticket represents the ability of the client 314 to request that list of resources from a resource owner 310. Tickets may also define which resource server 312 is required to fulfill a resource. The forgoing data is stored as clients and capability tickets data 722.

Resource servers 312 have the same OAuth 2.0 client data as a client 314 (resource servers and capability data 724). Each resource server 312 has a list resources it may issue. Each resource is tagged with the maximum LOA at which the resource server 312 may issue that resource (e.g. resource definitions 726 of FIG. 7).

Resource owner data 712 will now be described.

As shown in FIG. 7, authorization server user data 726 maintains account data 728, which includes a list of registered resource owner accounts, and permissions 730.

An account 728 represents a registered resource owner 310. The account record holds the original identity provider assertion, account identifier, and the authenticator's public information required for subsequent authentications.

Permissions 730 record the resource owner-directed data authorization policies. Each policy contains a specific client capability (resource within a ticket) and resource server capability with sufficient LOA to provide the resource. The permission also contains an opaque proof that can be used by the specific resource server 312 to make its own authorization server 318. This proof relies on data established during resource server account discovery by the resource owner 310.

Transient transactional data 714 will now be described.

Network protocols include transient data which exists to enable the flow of the protocol but does not require long term storage to add value to network, service provider, or client 314 goals.

The authorization server 318 includes exposed interfaces. The authorization server 318 exposes three interfaces.

An UMA interface 732 (e.g. UMA 2.0 interface) is used by the client 314 to request protected resources and receive authorization tokens.

The interface 732 is also used by the resource server 312 to introspect received tokens for validity and permission scopes.

A resource owner interface 734 is used by the agent 320 to register and authenticate a resource owner 310.

The interface 734 also allows the authenticated user to create and revoke permissions.

An administrator interface 736 allows the authorization server operator to manage the capabilities and scope of the authorization servers 318. This includes membership of identity providers 322, resource servers 312, and clients 314, along with their capabilities and operating LOA. The authorization server operator also manages the resources protected by the authorization server 318.

The client 314 fulfills a standard UMA role.

Clients 314 require protected resources in order to continue an interaction with their end-user.

Resource requests by a client 314 must be pre-approved and registered by the authorization server operator.

Registration of capabilities ensures that clients 314 may only request data they need to provide value to their end-user.

The registration of client capabilities is defined by the network operator. The client data request follows the UMA request flow.

The client 314 requests authorization for a specific capability ticket, informing the resource owner 310 which resources need to be granted.

After the resource owner 310 has provided authorization for the ticket, the client 314 exchanges the ticket for access tokens valid to (many) resource servers 312.

The client 314 uses the access tokens to request protected resources from a resource server 312.

The lifetime and validity of a token is controlled by a network policy defined by the operator.

In some cases, the authorization server 318 may be configured to trust an external governance or capability ledger for cross-federation of authorization servers.

Figure 8:
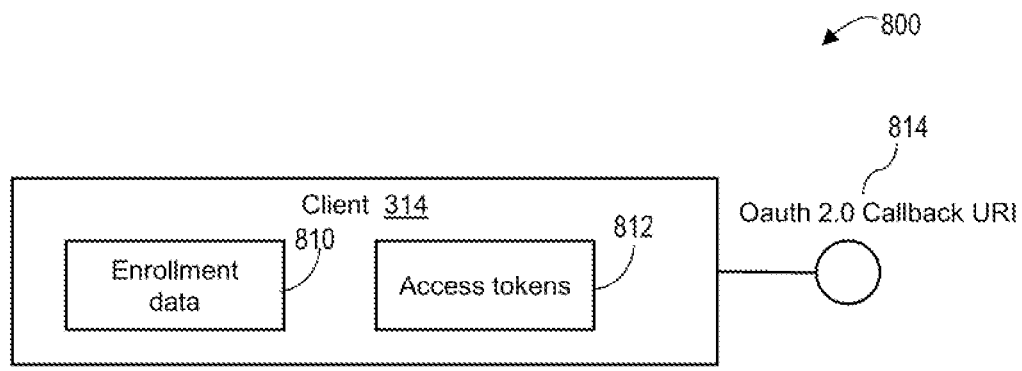
FIG. 8 is a block diagram of client data storage and interface requirements, according to an embodiment.

Referring now to FIG. 8, shown therein are client data storage and interface requirements 800, according to an embodiment.

As shown in FIG. 8, the client 314 holds two types of data: enrollment data 810 and transactional data 812.

Enrollment data 810 represents the ability of the client 314 to interact with the authorization server 318. This includes OAuth data, such as client ID and secrets, and the federated privacy exchange tickets representing their request capabilities.

The client 314 also holds transactional data 812 such as states and authorization tickets required by the UMA flow. After receiving access and refresh tokens, and depending on the use case, the client 314 may hold these tokens for continued and future use.

The client 314 supports a callback URL interface 814 (as required by UMA (OAuth)). This URL is called by the authorization server 318 after the requesting party 316 authentication is complete. The URL includes either the authorization ticket required to get access tokens or an error code.

The resource server 312 fulfills a standard UMA role by holding the protected resources of a resource owner 310 and respects authorization grants issued by the authorization server 318.

Figure 9:
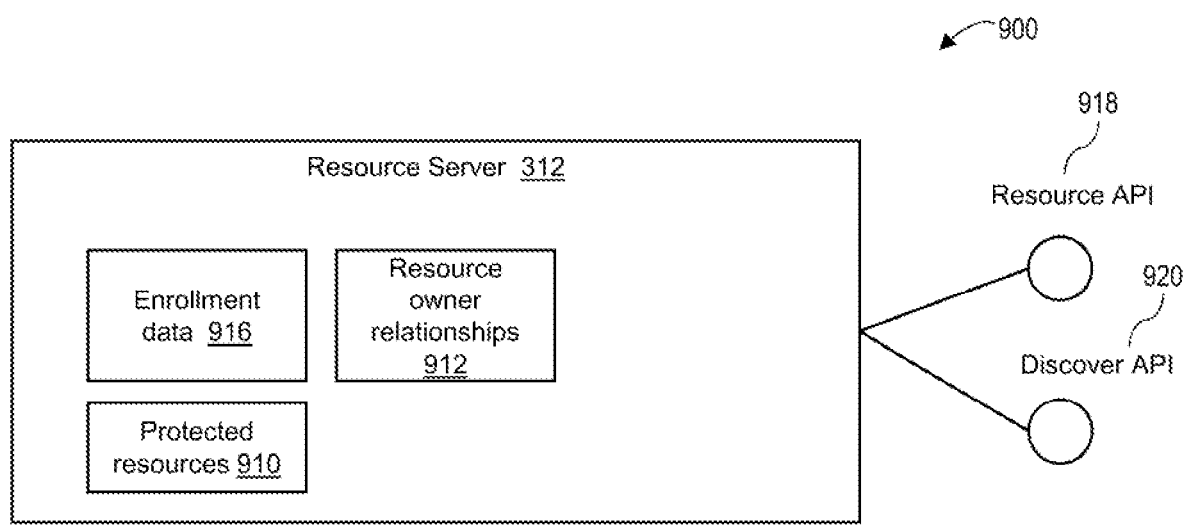
FIG. 9 is a block diagram of resource server data storage and interface requirements, according to an embodiment.

Referring now to FIG. 9, shown therein are resource server data storage and interface requirements 900, according to an embodiment.

The resource server 312 pre-registers the protected resources 910 it can provide as capabilities with the authorization server 318 (e.g. resource servers and capability data 724).

This registration of protected resources 910 allows the resource owner 310 to determine which resource servers 312 may be able to fulfill a client 314 request by inspecting the public registry 716 of the authorization server 318.

The way in which a resource server 312 registers capabilities with the authorization server 318 is defined by the network operator. The relationship between a resource owner 310 and resource server 312 is established through a discovery process controlled by the resource server 312. The resource server 312 makes a sufficient determination of the identity of the resource owner 310 through interactive claims-gathering (e.g. claims gathering 328 of FIG. 3) before allowing or assigning access rights to the relationship.

A primary purpose of the resource server 312 is to hold and issue protected resources 910 on behalf of the resource owner 310.

The resource server 312 also stores resource owner relationships data 912.

Resource owner relationships data 912 includes resource owner authorization data, a record of issued relationships, and their access rights.

The relationship data 912 is used to make an authorization decision upon receiving a client 314 resource request.

The resource server 312 also holds enrollment data 916.

The enrollment data 916 includes authorization server 318 enrollment information, such as a client ID and secret, and public names for resources. This metadata is required to use the introspection endpoint of the authorization server 318 to determine the resource owner 310 associated with the client 314 request.

As shown in FIG. 9, the resource server 312 includes a protected resource API 918.

The resource server 312 presents the protected resource API 918 to the client 314.

The structure of the API 918 is defined by the resource definition at the authorization server 318 (e.g. resource definitions 726 of FIG. 7).

The client 314 accesses the protected resource API 918 with an authorization token issued by the authorization server 318.

The resource server 312 also includes a discovery API 920.

The resource server 312 presents the discovery API 920 to the agent 320.

The resource owner 310 uses the discovery API 920 to perform interactive claims-gathering (e.g. claims gathering 328 of FIG. 3) and to create a relationship with the resource server 312.

In some embodiments, the resource server 312 is configured to verify an intention of the resource owner based on conveyed authorization information. This information may be conveyed through an authorization grant or introspection interface. In some embodiments, the resource server 312 is configured to issue credentials directly to the agent 320. The credentials may be issued with data for direct presentation. The credentials may be issued to establish key material for the resource owner 310 to set policy at the authorization server 318.

Referring now to FIGS. 10 to 13, flows across components of the distributed authorization system of the present disclosure (e.g. system 300) will now be described, which illustrate the use of resources via a federated privacy exchange.

Figure 12:
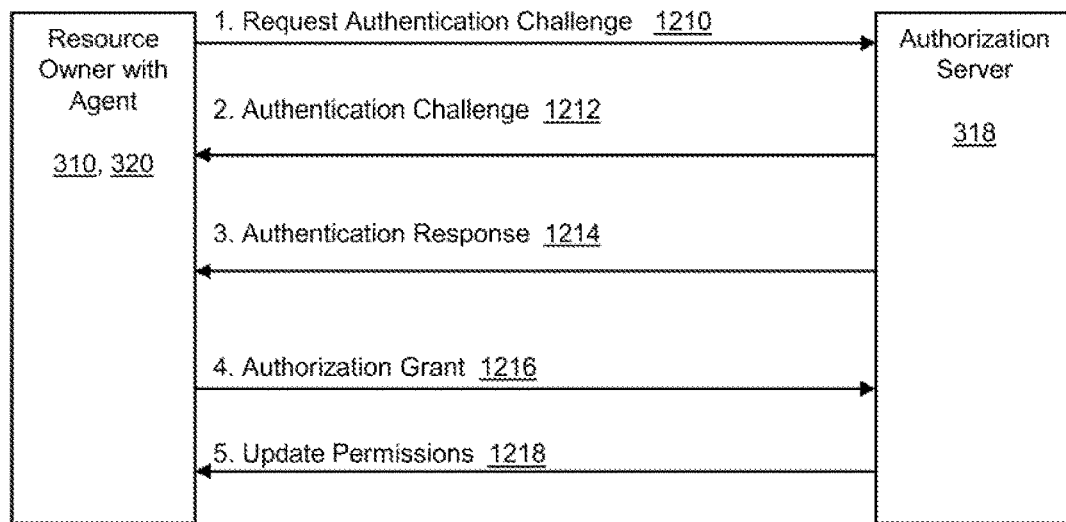
FIG. 12 is a flow diagram illustrating resource owner authentication, according to an embodiment.
Figure 13:
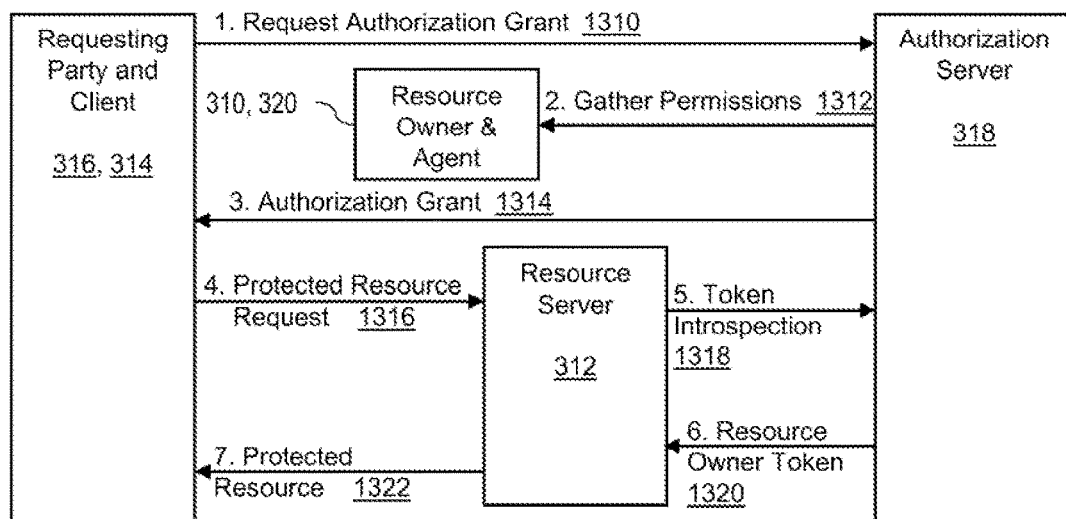
FIG. 13 is a flow diagram illustrating client authorization request, according to an embodiment.

The flows include authorization server account registration (FIG. 10), resource server rights discovery (FIG. 11), resource owner authentication and permissions management (FIG. 12), and client authorization request (FIG. 13).

Figure 10:
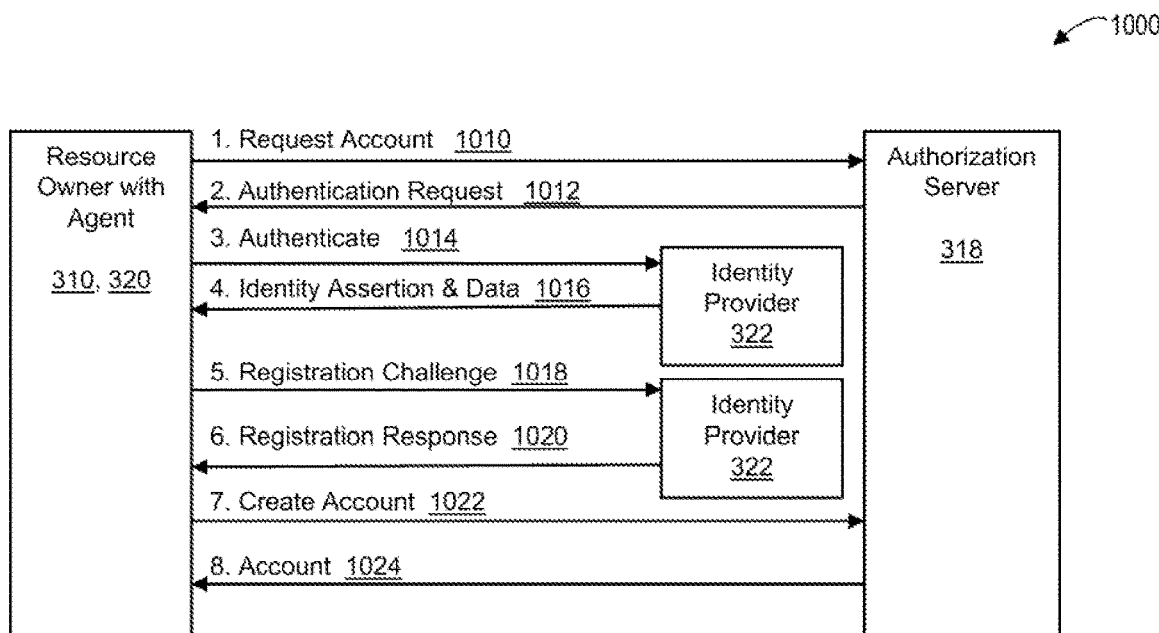
FIG. 10 is a flow diagram illustrating authorization server account registration, according to an embodiment.

Referring now to FIG. 10, shown therein is a flow 1000 illustrating authorization server account registration, according to an embodiment. The flow includes interactions between the identity provider 322, resource owner 310, agent 320, and authorization server 318.

The resource owner 310 registers with the authorization server 318 to control their resource permission and to respond to client 314 authorization requests.

Account registration binds a resource owner identifier to an identity provider assertion and a public authenticator.

Registration is federated to an approved identity provider 322 and mediated by the agent 320. This configuration ensures the privacy respecting operation of the authorization server 318.

At 1010, the agent 320 requests a new authorization server account (e.g. account 324 of FIG. 3) on behalf of the resource owner 310.

At 1012, the authorization server 318 records the request and issues a registration challenge to the resource owner 310.

At 1014, the resource owner 310 authenticates to an identity provider 322 using an already established credential.

At 1016, the identity provider 322 returns an identity assertion and user data to the agent 320.

At 1018, the agent 320 sends the registration challenge to a resource owner authenticator 1050.

At 1020, after the resource owner 310 authenticates, the authenticator 1050 returns the registration response to the agent 320.

At 1022, the agent 320 packages the unique identifier, identity assertion, and registration response and sends this information to the authorization server 318.

At 1024, the authorization server 318 validates the received registration information, creates a new account (e.g. account 324 of FIG. 3), and returns the result to the agent 320. The new account is also known by the agent 320 (e.g. account 510 of FIG. 5).

The user owns their authorization server account. The user may register multiple times without being correlated by the authorization server 318. The user controls the account identifier.

User assertion is independent from profile data. Account 324 creation is federated to the identity provider 322. The identity provider 322 acts as a "gateway" to interact with the system 300.

The user needs an assertion from an approved identity provider 322 to create a new account 324.

The separation allows the user and the agent 320 to hold the profile data without disclosing it to the authorization server 318.

The user controls their authenticator 1050.

The authorization server 318 may support many authentication mechanisms. The supported authenticators 1050 may be updated over time to meet changing authentication standards and mechanisms.

The authorization server 318 is configured to evaluate the response from the authenticator 1050.

The agent 320 executes the protocol with the resource owner 310 and authenticator 1050 to generate the response.

Figure 11:
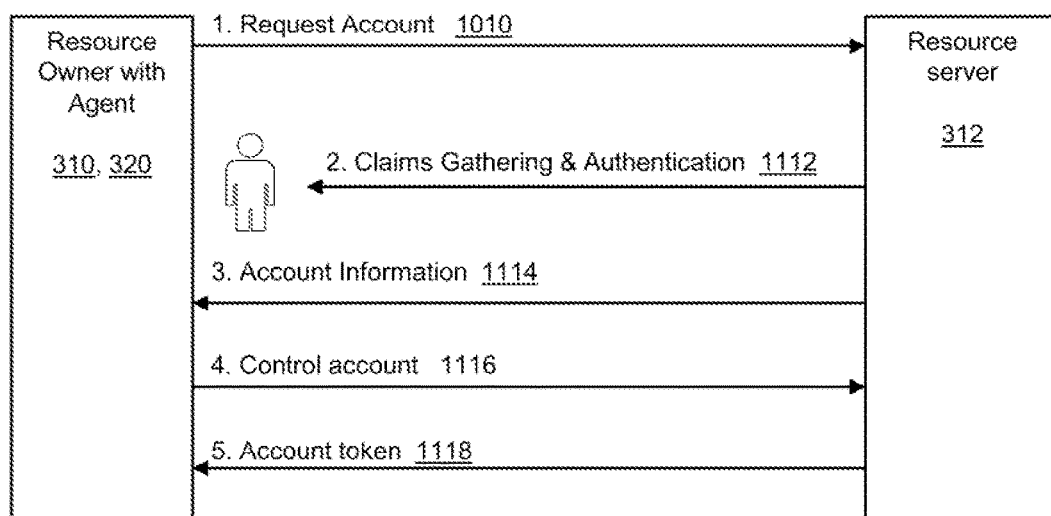
FIG. 11 is a flow diagram illustrating resource server rights discovery, according to an embodiment.

Referring now to FIG. 11, shown therein is a flow 1100 illustrating resource server rights discovery, according to an embodiment. The flow 1100 includes interactions between the resource owner 310 and the resource server 312.

To control resources at a resource server 312, the resource owner 310 needs to authenticate and establish their rights.

The resource owner 310 uses the issued relationship to create permissions at the authorization server 318.

The resource server 312 uses the relationship to recover the user's data access rights upon a resource request from a client 314.

This mechanism may take many forms depending of the desired traceability and acceptable correlation of the user at the authorization server 318.

The mechanism may be different at different resource servers 312. For example, the mechanism may include a unique token shared between the resource owner 310 and the resource server 312, which the resource server 312 binds to a local account, or a pairwise secret the resource owner 310 can use to derive many unlinkable tokens.

At 1110, the agent 320 redirects the resource owner 310 to the resource server 312 for interactive claims-gathering (e.g. claims gathering 328 of FIG. 3).

At 1112, the resource owner 310 presents credentials and claims to the resource server 312. The resource server 312 should establish confidence in its assessment of the identity of the resource owner 310.

At 1114, once the resource server 312 has authenticated the user, the resource server 312 provides information to the agent 320 about the resource owner's 110 data rights at the resource server 312.

At 1116, the resource owner 310 reviews and accepts the issued rights. The agent 320 request a new relationship with the resource server 312.

At 1118, the resource server 312 confirms the creation of the relationship.

The user controls their relationship to the resource server 312. The discovery process provides the user a way to control the disclosure of their protected resources to clients 314.

Protected resources (e.g. resources 910 of FIG. 9) may take two forms: personal data about the resource owner 310 or data which the resource owner 310 has rights to control based on other authorization decisions.

Resource server account discovery is independent of the authorization server 318.

The resource owner 310 may use a resource server relationship with many authorization servers 318.

The authorization server 318 accepts any permission from an authorized account without knowing if the proof of relationship will be honoured by the resource server 312.

The authorization server 318 has no way to learn if an account 324 is related to a resource server 312.

The discovery process is directed by the resource server 312.

The resource server 312 is responsible for authentication, verifying, or proofing the citizen/user, along with any other authorization controls required to establish the scope of data the resource owner 310 may control.

The resource owner 310 claims-gathering may take many forms, from a traditional credential presentation to an interactive questionnaire, or even an out-of-band interaction such as in-person identity verification.

Referring now to FIG. 12, shown therein is a flow 1200 illustrating resource owner authentication and permissions management, according to an embodiment. The flow 1200 includes interactions between the resource owner 310, the agent 320, and the authorization server 318. The flow 1200 can be implemented by the system 300 of FIG. 3.

To perform permission changes and respond to client requests, the resource owner 310 needs to authenticate against an established account.

The resource owner 310 uses the authenticator bound to their account identifier to process an authentication challenge.

At 1210, the agent 320 requests an authentication challenge on behalf of the resource owner 310.

At 1212, the authentication challenge is issued to the agent 320 and handled by the resource owner 310 using their registered authenticator.

At 1214, the agent 320 sends an authentication response.

At 1216, the authorization server 318 evaluates the authentication response. If the authentication response is valid, the authorization server 318 issues a transient authorization grant.

At 1218, the authorization grant may be used by the agent 320 to update the resource owner's 310 permissions or to respond to an authorization request from a client 314.

The authentication using authenticator is established during account registration. Access token issuance is traceable back to an authentication event.

An authenticated user may manage their client permissions (e.g. permissions 332 of FIG. 3).

Permissions are generated using a secret. The secret is held only by the resource owner 310 and resource server 312.

The authorization server 318 is configured in such a way that it has no way to understand the rights granted to the resource owner 310 or even determine if the resource server 312 will respect the created permission.

Referring now to FIG. 13, shown therein is a flow 1300 illustrating a client authorization request process, according to an embodiment. The flow 1300 includes interactions between the requesting party 316 and the authorization server 318. The flow 1300 can be implemented by the system 300 of FIG. 3.

The client 314 makes an authorization request using a registered capability ticket.

The client 314 gets access to resource servers 312, permitted by the resource owner 310, to fulfill the requirements of the registered capability ticket.

At 1310, the client 314 sends a new authorization request to the authorization server 318. The request includes the requested resources (e.g. protected resources 910 of FIG. 9) and scopes.

At 1312, the authorization server 318 delegates resource owner authentication and permission management to the agent 320.

At 1314, the authorization server 318 issues authorization and resource locations to the client 314.

At 1316, the client 314 requests the protected resource from the resource server 312. The request may include an access token.

At 1318, the resource server 312 introspects the access token using the authorization server 318.

At 1320, the resource server 312 is given a resource owner relationship and list of granted resources by the authorization server 318. This may include or be represented by a resource owner token.

The resource server 312 evaluates the grant against the rights of the resource owner 310.

At 1322, the resource server 312 releases the authorized protected resources to the client 314.

The client request may be a standard UMA authorization grant. However, the client 314 is not able to request access to a specific resource server 312. The ticket represents the ability of the client 314 to access resource types, regardless of the resource server 312.

Instead of issuing a single token, the client 314 is given a token per resource in the ticket. This may allow fine grained revocation of permissions and access to many resource servers 312 at once.

The system 300 may advantageously provide separation of responsibility and authority.

The system 300, and the specification implemented thereby, can extend and replace the UMA interactive model in multiple ways.

The authorization server 318 defines the boundaries of resources and the scopes available to each resource.

The authorization server 318 also interprets how client resource requests map to permission requests.

Instead of interacting directly with the authorization server 318, the resource owner 310 works with the agent 320 to configure policy conditions (authorization grant rules) at the authorization server 318.

The authorization server 318 executes these policies in the process of issuing access tokens.

The authorization process makes use of claims gathered from the requesting party 316 and the agent 320 in order to satisfy all operative policy conditions.

The following concepts enable these changes to the UMA model.

The agent 320 manages personal and private data. The authorization server 318 does not manage personal or private data.

The authorization server 318 holds the network resource model and membership.

The authorization server 318 records pseudo-anonymous data about members and transactions (DIDs defined by the user).

The identity provider 322 is the "gateway" to network membership. The authorization server 318 federates the initial account creation to the identity provider 322 group. This can ensure every resource owner 310 has undergone some authentication process.

LOA is tagged to members and data.

The distributed authorization systems of the present disclosure may be designed and configured to address privacy and security concerns. The federated privacy exchange seeks to allow sovereignty of organizations on responsibilities and data which have traditionally been in their purview, opening up high bandwidth service channels and new revenue streams. Consumer volumes are secured by appealing to the desire for ease of use and respect of privacy.

Privacy and security goals of the system 300 include data integrity, pseudonymous relationships, anonymous mementos, privacy, and accountability.

Business operates on certainty of data and its provenance. The federated privacy exchange may ensure this knowledge using a combination of standard and advanced cryptography.

Pairwise pseudonyms are at the heart of consumer-provider relationships. This allows strong authentication, personalization of services according to customer preferences, and reduced transaction risk. Pairwise pseudonyms are protected data between the transacting parties.

The public exchange allows in-the-open registration of anonymous memento which supports strong proofs of relationships given supporting secrets. This is achieved through the use of anonyms which deliver unlinkability of transactions.

The federated privacy exchange implements privacy by default. Transactions and identifiers are provably unlinkable, without supporting secrets. Semantic relationships and entitlements are proved in the open at the ledger level in a zero-knowledge manner. Advanced cryptography ensures that attestations convey only what is needed and leak no further information.

The "good-citizenship" of organization and individual can be achieved through a set of governance and data-logic approaches which include forensic use cases for deanonymization, auditable obligations, no-framing, and non-repudiation. These are achieved through cryptographic mechanisms achieving provable accountability.

The systems and methods of the present disclosure can scale and solve different problems.

Domain Trusted Digital Identity

The federated privacy exchange enables an authoritative registry (within a given domain, industry or governmental body) to allow citizens to register and receive an identity inside of the registry, and then use external verifiers to validate and increase the assurance of that identity. Once registered, the citizen receives a domain-trusted digital identity that can be used for transactions within that domain, and possibly within other domains as well.

Once a citizen has established a digital identity, the citizen is able to complete secure, privacy preserving transactions using the federated privacy exchange of the distributed authorization system with the help of an agent 320.

For example, a local health region can introduce the ability for community members to complete a digital registration process that would result in a "Trusted Health Identity." This new Trusted Health Identity may allow the citizen to access digital health services and tools, as well as bring more efficient interactions within local hospitals and clinics.

In order to register, the citizen can leverage any of a number of already existing authoritative sources that exist on the federated privacy exchange, ranging from social media services to banks, telcos, and even other digital identity services. In the case of the local health region, the community member may choose to register with their Google or Hydro account.

Citizen Proofing and Step-Up

Citizens who register a digital identity on the federated privacy exchange using a low assurance authoritative source can increase the assurance of their new identity with the help of external verifiers in a step-up verification process.

The process of identity proofing and step-up verification is particularly important if the citizen chose to complete their initial registration with a low-assurance authoritative source such as social media.

The external verifier can provide an additional proof of identity for the citizen that could increase the LOA of their digital identity. The external verifier may also function as a resource server 312, providing an essential attribute that is required to establish a domain-trusted identity. The role could be filled by a number of sources that exist on the federated privacy exchange, including additional authoritative sources or an in-person verification process provided by trusted persons working within the domain.

Returning to the example of a local health region, a community member who registers a digital identity using their Google account may complete a one-time in-person verification process with the help of an administrative clerk when they visit the hospital. After completing the in-person verification, the community member now has a domain-trusted identity and can access all digital services and tools, rather than just the small portion they might have been limited to otherwise for privacy reasons.

Rights-Based Resource Server 312 Access

A service provider can easily manage rights-based access to their data or services using the federated privacy exchange of the distributed authorization system of the present disclosure.

The service provider (e.g. client 314) requests access to attributes or records from a resource server 312. The resource server 312 matches the citizen (resource owner) with their own set of users and identifies what that citizen has the rights to access.

In an example, both a physician and a normal citizen wish to use a service provider that requires them to have access to health records.

When the citizen uses an agent 320 to match their digital identity with the resource server 312, the resource server 312 only authorizes that citizen to access their own health records.

When the physician uses an agent 320 to match their digital identity with the same resource server 312, the resource server 312 would allow the physician to access many health records based on some authorization factor.

The resource server 312 maintains the "rights" allowed for each citizen (e.g. physician, patient).

Alternately, the federated privacy exchange can restrict access to data or services through LOA.

A citizen who has created a digital identity using a low assurance authoritative source (such as social media) can be blocked from accessing higher security or privacy tools and services based on the low LOA.

For example, suppose a local health region encourages community members to register a digital identity. For greater adoption, the community members can register with a social media account. In order to comply with privacy needs, however, the local health region blocks any digital identity with a low LOA from accessing services that handle personal health information. Additional examples include GDPR compliance and international travel and border security and smart cities.

Authorization Server Account Registration

A resource owner 310 creates an account 324 with the authorization server 318. This account creation, or registration, roots the identity of the resource owner 310 to an attestation issued by an identity provider 322 and binds it to an authenticator. This process is mediated by the agent 320 on behalf of the resource owner 310. The agent 320 may help the resource owner 310 maintain the account and/or authenticator.

The resource owner 310 authentication to the identity provider 322 may use a variety of mechanisms, as long as the authentication assertion can be separated from the user information. This requirement allows the authorization server 318 to remain privacy-respecting and prevents the authorization server 318 from seeing any personal information about its registered users.

The federated privacy exchange specification shows the identity provider 322 as an OIDC provider. OIDC allows federated dynamic registration which eliminates the need for the agent 320 to have a pre-established client relationship to the chosen identity provider 322. This is a convenient feature because the authorization server 318 may accept assertions from many identity providers 322. The OIDC protocol is configured to issue the identity assertion (ID token) and data (user info) separately.

Figure 14A:
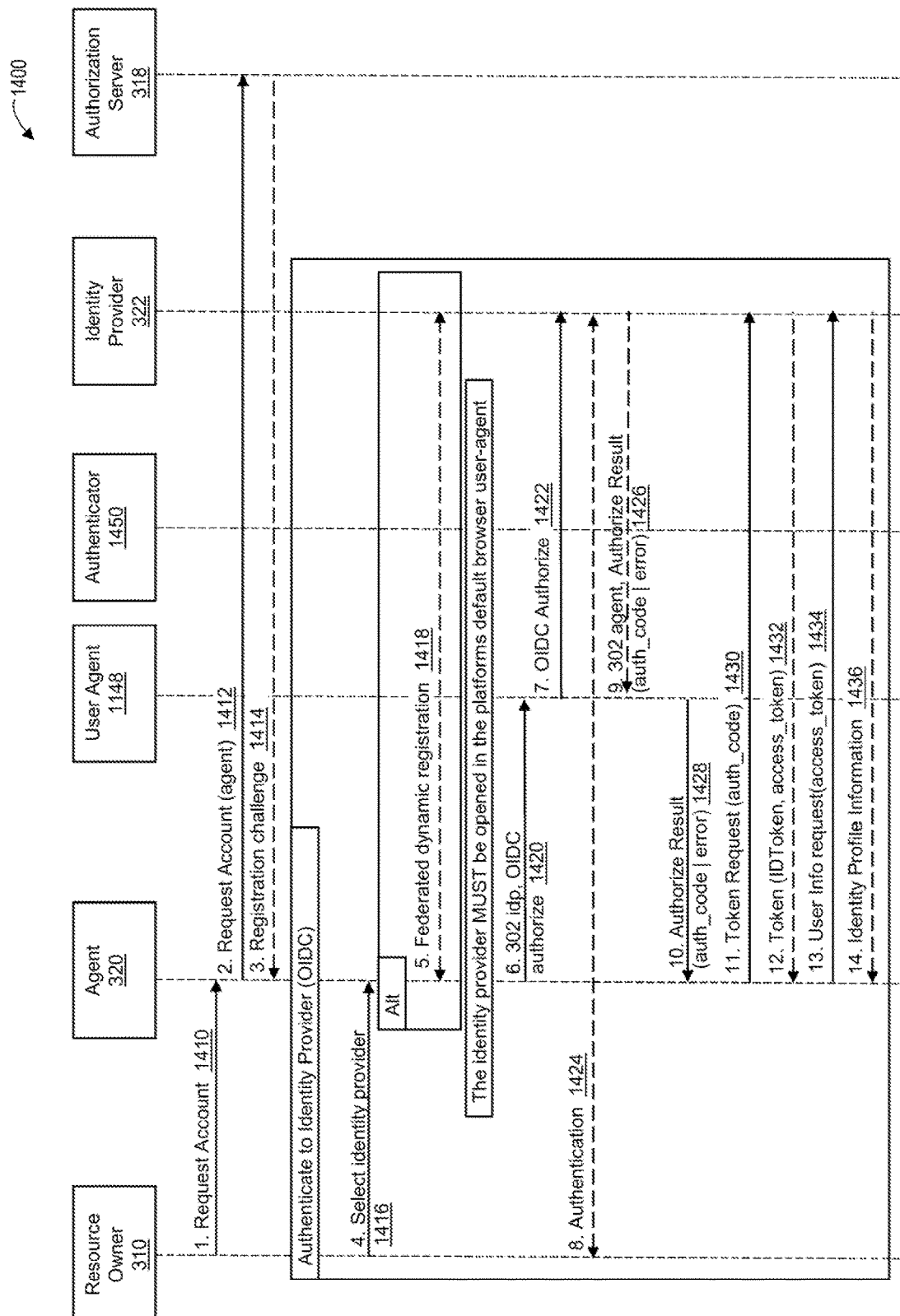
FIGS. 14A and 14B are a flow diagram illustrating resource owner to authorization server interaction, according to an embodiment.
Figure 14B:
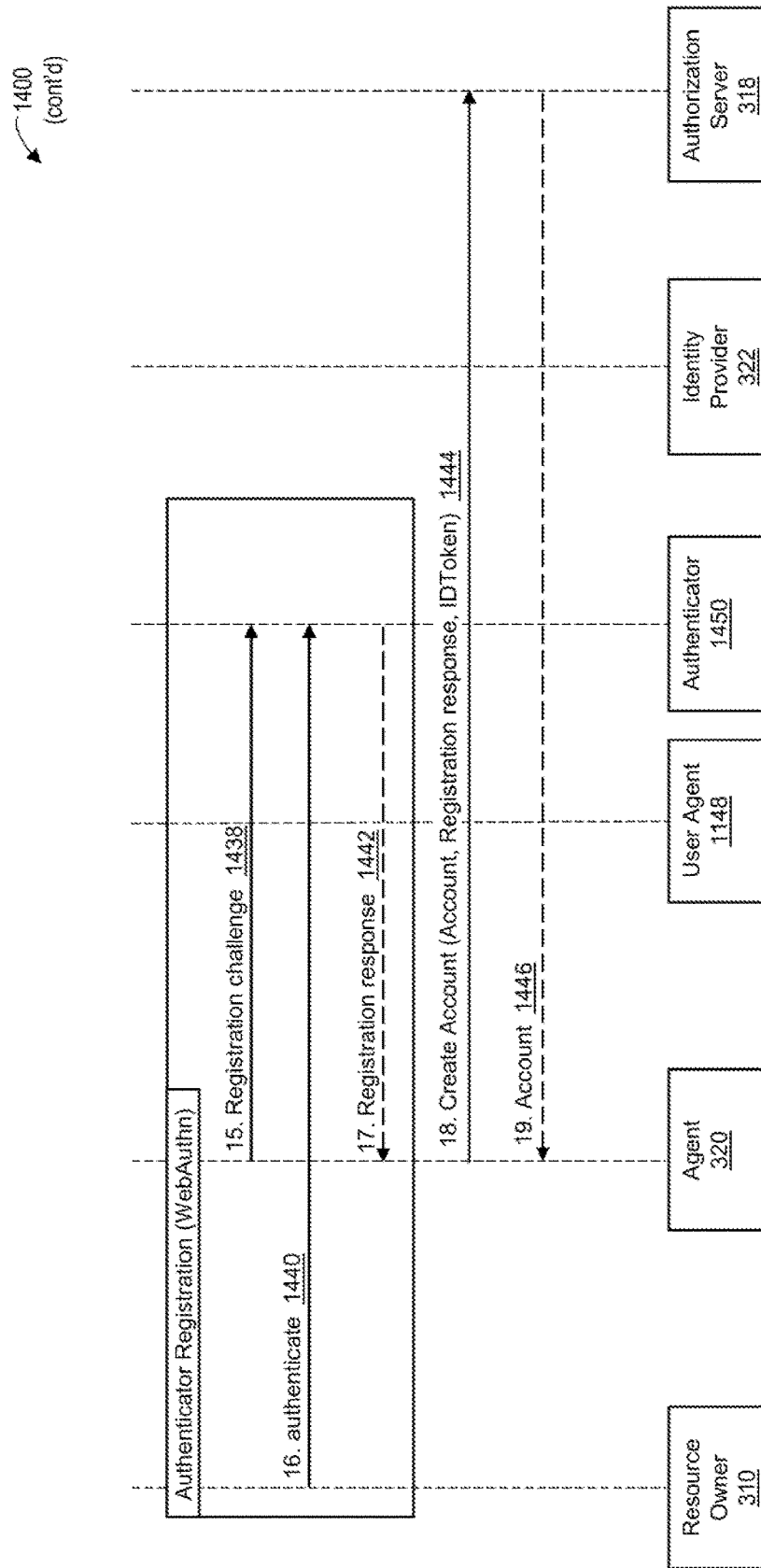

Referring now to FIGS. 14A and 14B, shown therein is a flow 1400 illustrating a resource owner to authorization server interaction, according to an embodiment. The flow 1400 may be implemented by the system 300 of FIG. 3.

As shown in FIGS. 14A and 14B, the resource owner 310 creates a new account 324 with the authorization server 318.

The resource owner 310 collects an ID token from an identity provider 322 and responds to a registration challenge using their authenticator.

At 1410, the resource owner 310 instructs the agent 320 to start the account creation process.

At 1412, the agent 320 requests an account for the resource owner 310 from the authorization server 318.

The agent 320 requests a new account for the resource owner 310 at the authorization server 318.

The account request is optional depending on the supported authentication methods.

The request includes the agent's identifier. This is so the authorization server 318 can issue an appropriate registration request. The supported authentication methods may vary between agents 320.

Example 1 below shows a sample account request.
GET /account?agent_id=a123 HTTP/1.1
HOST: fpe.server.com
. . .

At 1414, the authorization server 318 responds to the account request of the agent 320.

The authorization server 318 responds to the agent 320 request for a new resource owner 310 account.

The contents of the request response from the authorization server 318 depend on the authentication method supported by both the agent 320 and authorization server 318.

Via a reg_request, the authorization server 318 creates a unique registration request for this account creation instance. For example, the authorization server 318 may issue a FIDO RegRequest to the resource owner 310.

Example 2 below shows a sample registration request.

```
HTTP/1.1 200 OK
Content-Type: application/json
. . .
{
  "reg_request: {
    . . .
  }
}
```

At 1416, the resource owner 310 selects an identity provider 322 from an approved list.

At 1418, if the agent 320 is not a client of the identity provider 322, the two parties engage in dynamic registration.

At 1420, the agent 320 seeks ID token and user information from the identity provider 322.

At 1422, the resource owner 310 is redirected to the identity provider 322.

At 1424, the resource owner 310 authenticates to the identity provider 322.

At 1426, the resource owner 310 is redirected back to the agent 320 with the result.

At 1428, the agent 320 receives the authorization result.

At 1430, the agent 320 requests identity and access tokens for the resource owner 310.

At 1432, the identity provider 322 returns the identity and access tokens.

At 1434, the agent 320 requests a basic identity profile with the access token.

At 1436, the identity provider 322 returns the identity profile.

The agent 320 seeks an identity token and user information from the identity provider 322.

The agent 320 delegates resource owner 310 authentication to an identity provider 322 (see steps 1416-1436).

The agent 320 may use their client access to an identity provider 322 to redirect the user for authentication. The agent 320 is issued an OIDC ID token and user information representing the resource owner 310.

The process assumes the agent 320 has obtained a client identifier or a full set of client credentials to the identity provider 322. The credentials may be established either statically (in advance) or dynamically using federated registration.

At 1438, if the authentication mechanism is FIDO [FIDO-Alliance], the agent 320 seeks a registration response from the authenticator of the resource owner 310.

At 1440, the resource owner 310 authenticates and consents to the challenge.

At 1442, the authenticator returns the registration response to the agent 320.

The agent 320 seeks registration response from the resource owner's authenticator.

The agent 320 and resource owner 310 collaborate to generate a registration response (see steps 1438-1442).

The response is generated by combining the authorization server 318 registration challenge with a new authenticator. The authenticator contains secret data and should be controlled by the resource owner 310. For example, the authenticator may be a FIDO token [FIDO-Alliance], which generates a strong cryptographic response when given a registration request.

At 1444, the agent 320 requests account creation from the authorization server 318.

The agent 320 requests an account for the resource owner 310 from the authorization server 318.

Creating this request may depend on successfully gathering an identity assertion and authenticator registration response.

The two elements are bundled with a new identifier for the account. The agent 320 is responsible for signing the bundle, which allows the authorization server 318 to verify the content integrity. For example, the agent's request may be a signed JWT (JSON Web Token).

The request contains multiple elements.

The request contains an iss, which is the agent's public URL.

The request contains a sub, which is an identifier for this account, generated by the agent 320.

The request contains an aud, which is the authorization server 318 base URL.

The request contains an exp, which is an expiration timestamp of the token defined by the agent or resource owner 310.

The request contains an iat, which is a token issue timestamp.

The request contains a state, which is an initial state issued with the registration challenge.

The request contains a reg_response, which is a registration challenge created by the resource owner 310's authenticator.

The request contains an identity_assertion, which is an identity assertion issued by the identity provider 322.

Example 3 below shows a sample agent token.

```
{
    "iss" : "fpe.agent.ca",
    "sub" : "fpe:12345abcde",
    "aud" : "fpe.as.ca",
    "exp" : 1538498961,
    "iat" : 1538488961
    "identity_assertion" : { }
    "reg_response : "",
}
```

Example 4 below shows a sample token request.

```
POST /account HTTP/1.1
HOST: fpe.server.com
Content-Type: application/json
...
{
    "reg_token": "",
}
```

At 1446, the authorization server 318 responds to the account creation request of the agent 320.

The authorization server 318 validates the contents of the account request sent by the agent 320.

The authorization server 318 checks the signature of the agent 320 over the request contents.

The authorization server 318 checks that the payload includes the state, audience, issuer, expiration and issued times.

The authorization server 318 checks the identity assertion. The assertion is checked for validity and that it was issued by an approved identity provider 322. If the assertion is a JWT, validate a nested signature and issuer. If the assertion is not a JWT, the authorization server 318 uses an alternative way of ensuring the assertion was issued by the identity provider 322.

The authorization server 318 checks the authenticator registration response. The response should be created over a valid challenge issued by this authorization server 318.

The authorization server 318 responds to the agent 320 on account creation success.

If the registration token has acceptable contents, the authorization server 318 creates the account and responds to the agent 320.

The response confirms the new account identifier and the base LOA as issued by the identity provider 322.

Example 5 below shows a sample positive response for token request.

```
HTTP/1.1 200 OK
Content-Type: application/json
...
{
    "id_token": "14A11116-8BB5-4E6D-9E69-2C1A346D86E0",
    "loa": "fpe.server.com:loa:3"
}
```

The authorization server 318 responds to the agent 320 on account creation failure.

If any part of the registration token is found to be invalid, the authorization server 318 will return an error to the agent 320. The agent 320 can work with the resource owner 310 to correct any issues and may have to start a new account registration.

Authorization Server Account Management

The resource owner 310 uses their agent 320 to authenticate to an authorization server account and create or revoke permissions for client access to protected resources.

Referring now to FIG. 15, shown therein is a flow 1500 illustrating resource owner authentication, according to an embodiment.

The resource owner 310 engages an agent 320 to start a session with the authorization server 318.

The resource owner 310 uses their authenticator 1528, established during account registration, to respond to the authentication challenge and receive an access token.

As shown in FIG. 15, the resource owner 310 authenticates to the authorization server 318 using the authenticator 1528 bound to their account.

The authorization server 318 returns an access token. The access token can be used to manage permissions and/or respond to an authorization request from a client 314.

At 1510, the resource owner 310 instructs the agent 320 which account to authenticate.

At 1512, the agent 320 requests an authentication challenge from the authorization server 318 on behalf of the resource owner 310.

The authentication request is optional depending on the authentication method for the account.

The request includes the agent's identifier so the authorization server 318 can issue an appropriate authentication request.

Example 6 below shows a sample authentication request.

GET /authenticate?agent_id={agent_id} HTTP/1.1
Host:as.com

At 1514, the authorization server 318 responds to the authentication challenge request of the agent 320.

The authorization server 318 responds with an authentication challenge.

The contents of the response depend on the supported authentication methods between the agent 320 and authorization server 318. For example, it may be a FIDO AuthRequest or a nonce to be signed by a user certificate.

Example 7 below shows a challenge response to the authentication request.

```
HTTP/1.1 200 OK
...
{
    "auth_request": { }
}
```

An auth_request is to be fulfilled by the resource owner 310 with the registered authenticator. The actual contents of this response are defined by the authorization server 318 operator.

At 1516, if the authentication mechanism is FIDO, the authentication challenge is sent to the authenticator 1528.

At 1518, the resource owner 310 authenticates and consents to the challenge.

At 1520, the authenticator 1528 returns the authentication response to the agent 320.

The agent 320 seeks an authentication response from the authenticator 1528 of the resource owner 310.

The agent 320 and resource owner 310 collaborate to generate an authentication response.

The response is generated using the authenticator 1528 registered to the account of the resource owner 310 and the issued authentication challenge. In an example, the response may be a FIDO Auth Response.

At 1522, the agent 320 requests an authorization grant for the resource owner 310 using the authentication response of the resource owner 310.

Example 8 below shows a resource owner 310 authentication request.

```
POST /authenticate HTTP/1.1
Host: as.com
...
{
    "auth_response": { }
}
```

At 1524, the authorization server 318 responds to the authentication response of the agent 320.

The authorization server 318 validates the contents of the authentication request sent by the agent 320.

The authorization server 318 checks that the authentication response is correct and was generated by an authenticator previously registered to a valid account.

If the request is acceptable, the authorization server 318 generates a session for the account and responds with an access token.

If any part of the request fails to be verified, the authorization server 318 responds with an error to the agent 320. The agent 320 can work with the resource owner 310 to correct any issues and may have to request a new authentication challenge.

At 1526, the agent 320 requests a permission update.

The request may include multiple permission data structures, each with a reference ID supplied by the agent 320.

Resource owner 310 permission management will now be described.

Permissions can largely be split into two actions.

In a first action, the resource owner 310 creates and/or revokes abstract permissions. The abstract permissions represent the resource owner 310 granting permission for a client 314 to access a resource from a resource server 312.

A permission is not redeemable until the resource owner 310 or another authorized requesting party adds the permission to an ongoing ticket.

In a second action, the concrete application of permissions to tickets, for example "resource owner 310 grants this permission to this client 314 to fulfill this specific request".

Permission data structure will now be described.

The permission captures consent of a resource owner 310 for a resource server 312 to fulfill a client's capability.

The permission includes the resource server 312, client 314, an opaque identifier and a proof of consent.

The method for the proof is established directly between the resource owner 310 and resource server 312 during resource server 312 discovery.

permission_id is an identifier of the permission.

client_capability is an identifier of the client's capability being fulfilled.

resource_server_capability is an identifier of the resource server 312 capability. This capabilities-protected resource must match the client 314 capability.

resource_owner_token is a proof of consent created by the resource owner 310.

New permissions are created by generating unique permission_ids or by omitting the permission_id.

Existing permissions may be revoked by referencing an existing permission_id and removing the resource_owner_token. Permission revocation cascades to invalidate any existing valid client access tokens.

Example 9 below shows a bearer access token from authentication.

```
POST /permission HTTP/1.1
Host: https://as.ca
Authorization: Bearer access_token_from_authentication
...
{
"reference-id-1": {
    "permission_id": "permission-id-1",
    "client_capability_id": "client-capability-1",
    "resource_server_capability_id": "resource-capability-1",
    "resource_owner_token": "resource-owner-token-1"
    },
}
```

The authorization server 318 responds to the permission request of the agent 320.

The response by the authorization server 318 includes a result for each requested permission.

If the new permission was requested without a permission_id, the authorization server 318 generates and returns the created ID to the agent 320.

Example 10 below shows a response for permission upgrade request.

```
HTTP/1.1 200 OK
...
{
"reference-id-1": {
    "permission_id": "permission-id-1",
    "client_capability_id": "client-capability-1",
    "resource_server_capability_id": "resource-capability-1",
    "resource_owner_token": "resource-owner-token-1"
    },
}
```

Resource server account discovery will now be described.

The resource owner 310 authenticates to the resource server 312 to get a relationship token corresponding to resources held by the resource server 312.

The agent 320 is the relying party (RP) to the resource owner's authentication. The agent 320 may help the resource owner 310 maintain the issued token and bind the issued token to their authorization server 318 account.

The resource owner 310 uses the token when creating permissions. The authorization server 318 presents the token, or one derived by the resource owner 310 and agent 320, during token introspection with the resource server 312 to verify a client's access token.

The token represents the resource access privileges of the resource owner 310, based on an authorization assessment made by the resource server 312 about the identity of the resource owner 310.

The token allows the resource server 312 to recover those rights and apply a policy before completing a resource request from a client 314.

The mechanisms the resource server 312 may use any suitable authentication mechanisms to authenticate the resource owner 310.

Authentication may happen through credential presentation, interactive claims-gathering, or even a client authorization request to the authorization server 318. Regardless of the mechanism, the resource server 312 may make an individual authorization assessment to determine the specific rights to grant the resource owner 310.

The interaction between the agent 320 and resource server 312 may follow OIDC protocol for resource owner 310 authentication.

After authentication, the agent 320 may request what resources can be issued about this resource owner 310 and request a new authorization grant be issued for use with the authorization server 318.

Figure 16:
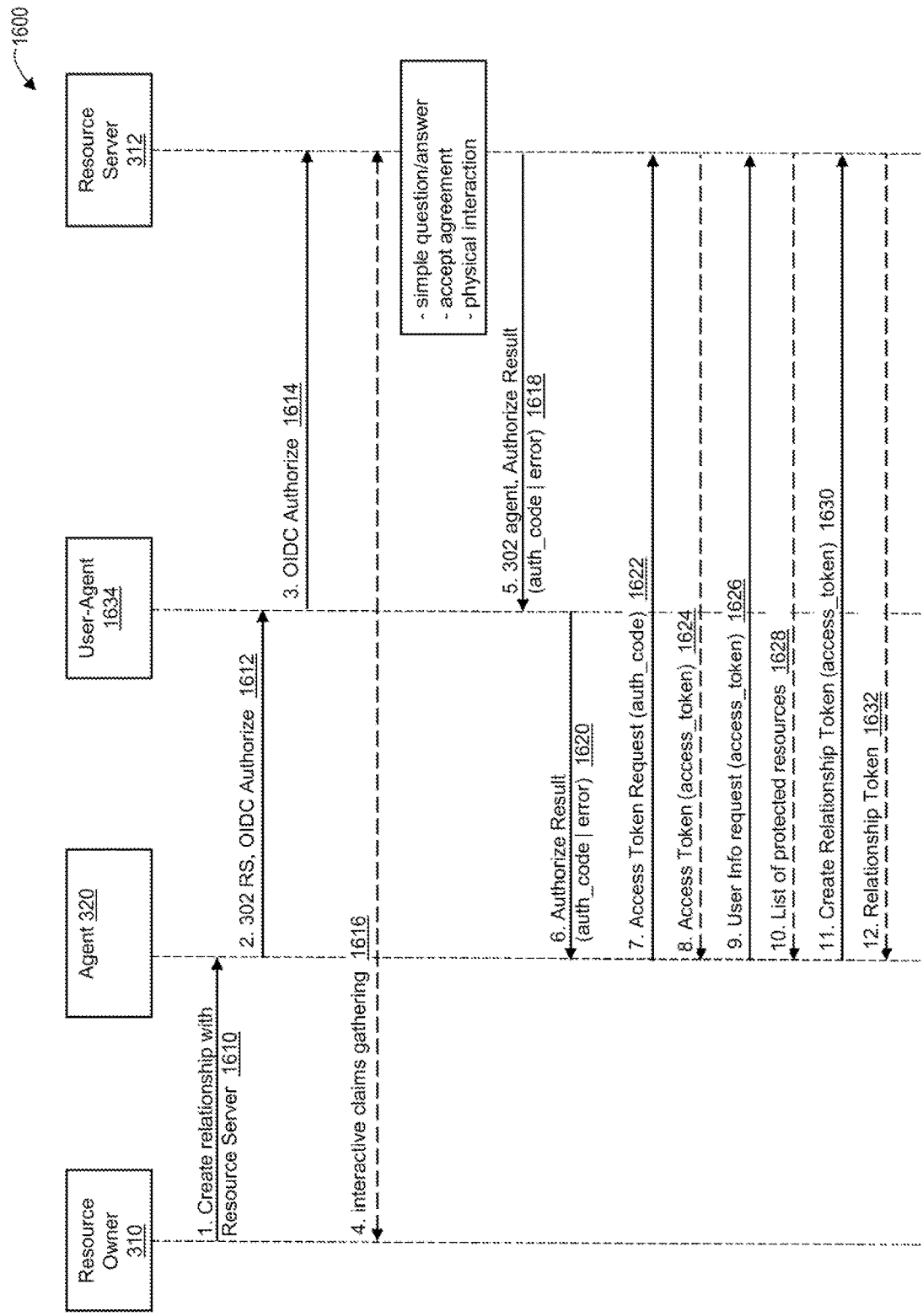
FIG. 16 is a flow diagram illustrating resource owner interaction with resource server, according to an embodiment.

Referring now to FIG. 16, shown therein is a flow 1600 of resource owner interaction with a resource server, according to an embodiment.

As shown in FIG. 16, the resource owner 310 uses an agent 320 to discover their relationship with a resource server 312.

The resource server 312 authenticates the resource owner 310 through an interactive claims-gathering process.

At 1610, the resource owner 310 tells their agent 320 they want to discover their account at the resource server 312.

At 1612, the agent 320 redirects the resource owner 310 to the resource server 312.

At 1614, the resource server 312 receives the authorization request.

At 1616, the resource owner 310 and resource server 312 complete interactive claims-gathering. The resource server 312 should be sufficiently convinced of the rights of the resource owner 310 after this process.

At 1618, the resource owner 310 is redirected back to the agent 320.

At 1620, the agent 320 receives the authorization result.

At 1622, the agent 320 requests an access token for the resource owner 310.

At 1624, the resource server 312 returns an access token related to the resource owner 310 authorization.

The agent 320 seeks an access token, identity token, and user information from the resource server 312.

The agent 320 may follow the OIDC authorization code protocol to seek access to the resource server 312 on behalf of the resource owner 310.

The agent 320 issues an OIDC authorization code request to the resource server 312. The resource server 312 performs one or more interactive claims-gathering processes with the resource owner 310, as required. The agent 320 is issued an access token and OIDC ID token upon resource owner 310 authentication. The resource server 312 sufficiently authenticates the resource owner 310 to determine the specific rights to grant to any new relationship token. For example, the resource server 312 may be able to uniquely identify the resource owner 310 using an existing credential or determine role-based rights from a further redirection to another identity provider 322.

The process assumes the agent 320 has obtained a client identifier or a full set of client credentials to the resource server 312. The credentials may be established either statically (in advance) or dynamically using federated registration.

At 1626, the agent 320 queries the resource server 312 for the granted rights.

At 1628, the resource server 312 returns the granted rights to the agent 320 for the review by the resource owner 310.

At 1630, the agent 320 creates a relationship token with the resource server 312 (to represent the resource owner 310).

The agent 320 requests tokenization of the resource owner 310.

The agent 320 includes a valid access token to identify the resource owner 310.

Example 11 below shows a sample request where the agent 320 requests tokenization of the resource owner 310.

POST /discover/complete
Host: http://rs-one.com
Authorization: Bearer accesstokenfromauthentication At 1632, the resource server 312 confirms the creation of the relationship The resource server 312 responds to the resource owner tokenization request of the agent 320.

The resource server 312 locally binds the issued token to the authorization determined during resource owner 310 authentication.

The resource server 312 expects to receive this relationship token, or an algorithmic derivative, from the authorization server 318 during client access token introspection.

The method for token proof generation or derivation is already determined between the agent 320 and resource server 312.

Example 12 below shows a sample response where the resource server 312 responds to the agent's tokenization request.

```
HTTP/1.1 200 OK
...
{
    "attribute_relationship": "an-resource owner token"
}
```

An attribute_relationship is the token issued to the agent 320, which represents a resource owner 310's resource access rights.

Details of client authorization request will now be described.

The client 314 requires specific resources to perform a service for their end-user. In order to receive the protected resources, the client 314 performs the UMA grant protocol using a capability ticket the client 314 has previously established with the authorization server 318.

The capability ticket is similar to the UMA permission ticket created by the resource server 312 during the tokenless resource access request.

The capability ticket represents a fixed set of resources the client 314 may request during interactive claims-gathering.

The requesting party 316 is redirected to an agent 320 for authentication.

After claims-gathering, the authorization server 318 issues an authorization grant which the client 314 may use to request the protected resources from the indicated resource server(s).

Interactions between the client 314, authorization server 318 and resource server 312 may conform to the UMA 2.0 standard. However, the client 314 may skip the tokenless request to the resource server 312 because of the capability ticket the client 314 has established with the authorization server 318. Also, on authorization success, the authorization server 318 may return multiple access tokens to the client, one for each requested resource or resource server 312.

The capability ticket may provide several integration and interoperability benefits. For example, the capability ticket allows the client 314 to integrate only to the authorization server 318, instead of to each resource server 312 which may support the needed API.

The capability ticket allows the authorization server 318 to grant access to many resource servers 112 from a single client request.

The capability ticket explicitly defines the resources the client 314 may request through this authorization server 318.

Figure 17:
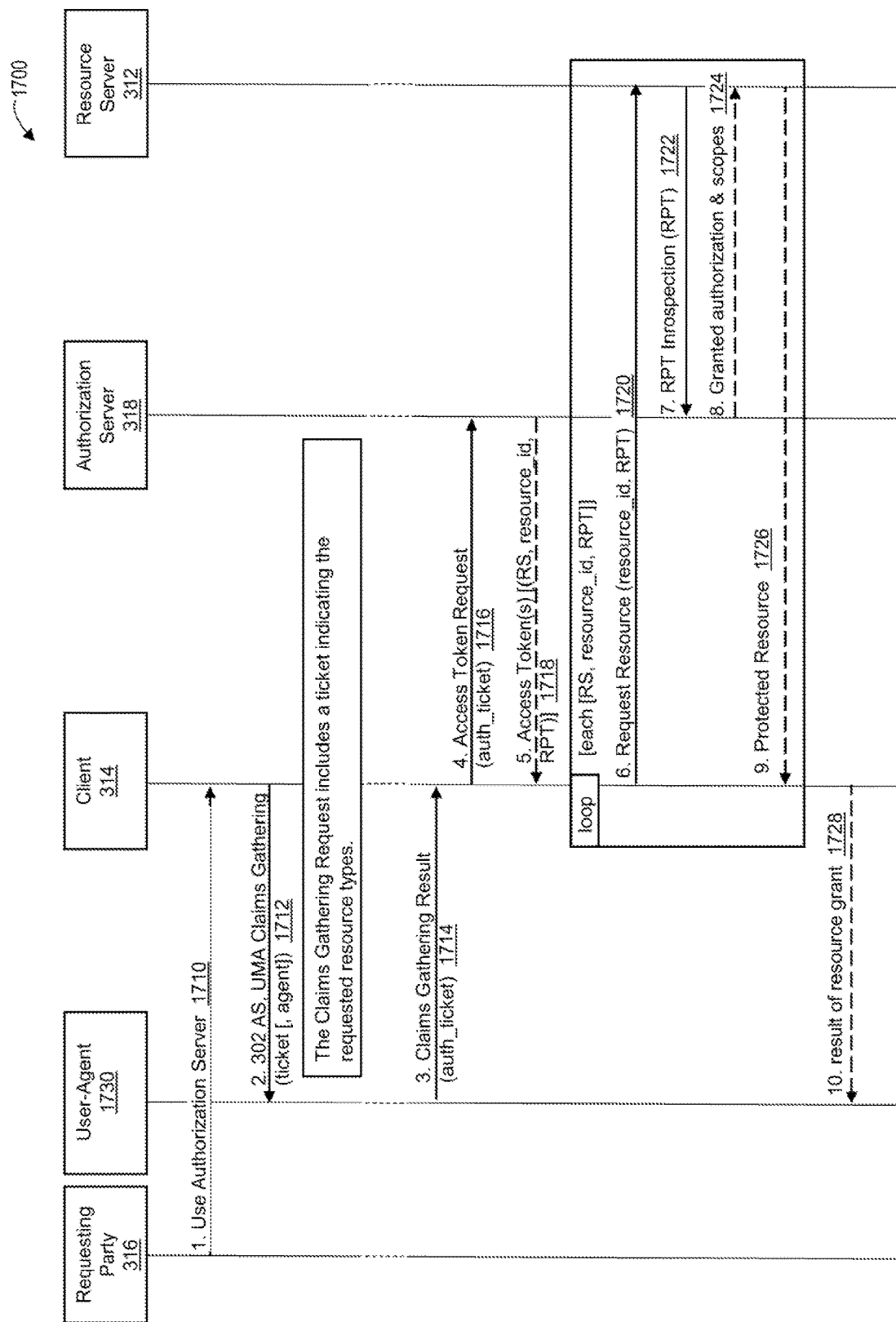
FIG. 17 is a flow diagram illustrating a requesting party instructing a client to get resources through an authorization server, according to an embodiment.

Referring now to FIG. 17, shown therein is a flow 1700 illustrating a requesting party 316 telling the client 314 to get resources through the authorization server 318, and the client following UMA 2.0 protocol to get authorization and then access protected resources, according to an embodiment.

At 1710, the requesting party 316 wants to use the authorization server 318 to grant protected resources to the client.

At 1712, the client 314 redirects the requesting party 316 to the authorization server 318 for claims-gathering.

The client 314 redirects requesting party 316 to the authorization server 318 for claims-gathering.

A ticket is a registered capability ticket of this client 314, which represents what is being requested to the authorization server 318. The ticket may be a permission ticket or a client capability ticket.

Example below shows a sample response of client 314 redirect of the requesting party 316 to the authorization server 318 for claims-gathering.

HTTP/1.1 302 Found
Location: https://as.ca/transaction/authorize?
Ticket=aTicket
&client_id=aClientId
&state=aState
&claims_redirect_uri-https
%3A%2F%2Fclient.com%2Fapp%2Ftransction%2Fcallback At 1714, the authorization server 318 redirects the requesting party 316 back to the client 314 after claims-gathering.

At 1716, the client 314 requests an access token from the authorization server 318 with an authorization grant.

Example 17 below shows a sample request.
POST/token HTTP/1.1
Host: as.com
Authorization: Basic clientsecret
Content-Type: application/x-www-form-urlencoded
. . .
grant_type=urn%3Aietf%3Aparams
%3Aoauth%3Agrant-type%3Auma-ticket
&ticket=226A2331-73FC-4087-9B07-56E41E49DA02 ticket is the permission ticket most recently received by the client 314 during this authorization session. This ticket is not the same as the capability ticket.

Example 16 below shows a sample request (application/json).

---

POST /token HTTP/1.1
Host: as.com
Authorization: Basic clientsecret
Content-Type: application/json ...
{
    "grant_type": "urn:ietf:params:oauth:grant-type:uma-ticket.", -continued "ticket": "226A2331-73FC-4087-9B07-56E41E49DA02"
}

---

At 1718, the authorization server 318 responds to the access token request of the client 314.

The response of the authorization server 318 depends on the result from the resource owner 310 authentication and permission gathering in the agent 320.

If authentication of resource owner 310 was successful and the authorization server 318 makes a positive authorization assessment, the authorization server 318 issues the access token to the client 314.

The federated privacy exchange may include a new token_type which contains multiple traditional bearer access tokens.

Example 17 below shows a sample response of the authorization server 318 response to the client 314 on authorization success.

---

HTTP/1.1 200 OK
...
{
    "access_token": "string",
    "token_type": "strong"
}

---

The issued access token is a JWT signed by the authorization server 318. The token contains typical JWT information along with an array of access token objects.

iss is the issuer of the token; should be the authorization server 318 uri.

and is the audience of the token; should be the client id or uri.

sub is the subject of the token; may be a unique subject per client request to maintain resource owner 310 privacy.

iat is the issued time of the token.

exp is the expiration time of the token (optional).

access_tokens is an array of access token payloads.

Each issued bearer token is packaged in an object, with additional parameters with resource server 312 location details.

rs_location If the resource is a distinct attribute, this is the path to the resource. If the resource is an API, this is the base_url to append specific paths to.

resouce_id is an ID of the resource from the capability.

Example 18 below shows sample access token contents.

---

{
    "iss" : "",
    "aud" : "",
    "sub" : "random subject",
    "iat" : 1234678,
    "access_tokens": [
        {
            "resource_id" : "the resource id",
            "rs_location" : "rs.com/registered/path",
            "access_token" : "for use at the rs",
            "token_type" : "Bearer",
            "expires_in" : 12345678
        }
    ]
}

---

At 1720, for each issued access token, the client 314 requests the protected resource from a resource server 312 and provides an access token.

The client 314 may include multiple authorization headers depending on the nature of the resource (for example, if resources are simple JSON attributes and can be combined into a single response). If the protected resource is an API, other HTTP verbs may be valid.

Example 20 below shows a sample request where the client 314 requests a protected resource and provides an access token.

GET /attribute-path HTTP/1.1
Host: rs.com
Authorization: Bearer access token

Example 21 below shows a sample request (batched) where the client 314 requests a protected resource and provides an access token.

GET /attribute-path HTTP/1.1
Host: rs.com
Authorization: Bearer access_token
Authorization: Bearer access token2

At 1722, the resource server 312 introspects the access token with the authorization server 318.

The resource server 312 introspects the access token with the authorization server 318 to determine whether the access token is still valid.

The registration of generic resource server 312 capabilities may avoid issues where the client 314 must know how to refer to the resource owner 310 at the resource server 312 when requesting resources. Instead, the resource owner 310 is identified to the resource server 312 through the introspection process. Token introspection also gives the authorization server 318 an opportunity to audit the client's resource access attempts.

Example 24 below shows a sample request where the resource server 312 introspects the access token with the authorization server 318.

```
POST /transaction/introspect HTTP/1.1
Host: as.com
Authorization: Bearer rsclientid
Content-Type: application/json
...
{
    "token": "tokenvaluehere"
}
```

At 1724, the authorization server 318 responds to the token introspection request.

If the access token is valid and active, the authorization server 318 provides details about the resource owner 310 and the resource the resource server 312 should return to the client 314 holding the access token.

Example 25 below shows a sample response of the authorization server 318 response to the resource server 312 on introspection success.

```
HTTP/1.1 200 OK
...
{
    "active": true,
    "token": "string",
    "resource_scopes": "string",
    "resource_id": "string",
    "client_id": "string",
    "sub": "string",
    "token_type": "string",
    "exp": 0,
    "iat": 0,
    "iss": "string"
}
``` sub is a relationship token the resource owner 310 established with the resource server 312 during the discovery process, which allows the resource server 312 to lookup the access rights of the resource owner 310.

resource_id allows a single resource server 312 endpoint to support fetching of many resources.

If the authorization server 318 encounters an error processing the access token, the authorization server 318 returns an error to the resource server 312. The resource server 312 does not release the resource to the client 314 who presented the access token.

Example 26 below shows a sample response of the authorization server 318 response to the resource server 312 on introspection failure.

```
HTTP/1.1 400 Bad Request
...
{
    "error": "invalid_resource_id",
    "error_description": ""
}
```

At 1726, the resource server 312 responds to the access token-accompanied resource request of the client 314.

If authorization is successful, the resource server 312 grants the client 314 access to the protected resource.

The contents of a successful response are determined by the resource definition from the authorization server 318.

Example 22 below shows a sample response of the resource server 312 response to the client 314 on authorization success.

```
HTTP/1.1 200 OK
...
{
    "resource_id" : "resource value"
}
```

If client authorization fails, the resource server 312 returns an error as if the client 314 had not included the access token.

Example 23 below shows a sample response of the resource server 312 response to the client 314 on authorization failure.

HTTP/1.1 403 Forbidden
Warning: 199—"UMA Authorization Server Unreachable"

Authorization server 318 response to the client 314 on authorization failure. If resource owner 310 authentication or authorization assessment fails, the authorization server 318 returns an error code. This is not shown in FIG. 17.

The authorization server 318 may return a new permission ticket if there are additional steps the client 314 may take to authorize.

Example 19 below shows a sample response of the authorization server 318 response to the client 314 on authorization failure.

```
HTTP/1.1 400 Bad Request
...
{
    "error": "invalid_request",
    "error_description": "Unsupported response_type value"
    "ticket": "Optional. New permission ticket"
}
```

Figure 18:
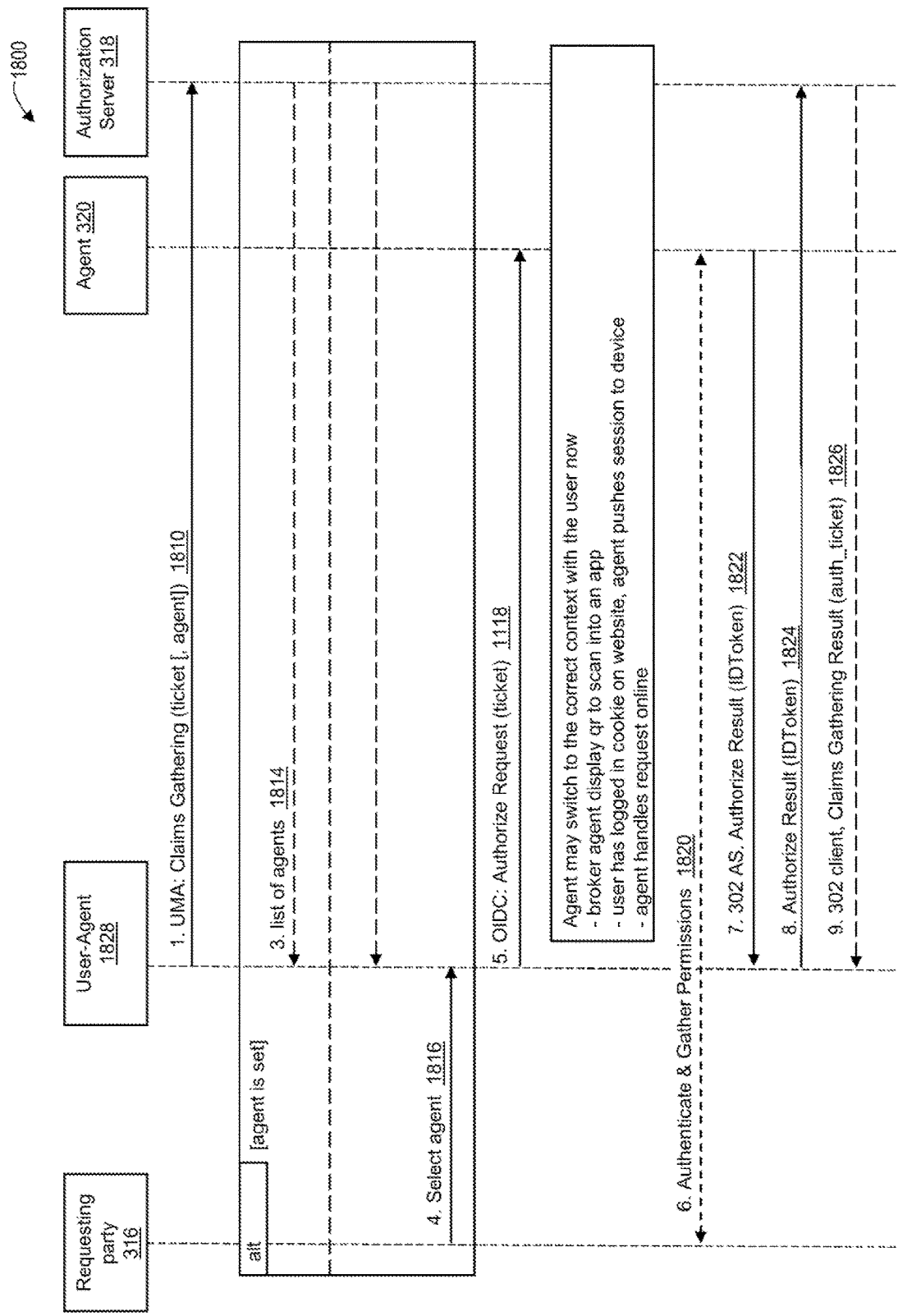
FIG. 18 is a flow diagram illustrating a requesting party responding to a client's ticket request using an agent, according to an embodiment.

Referring now to FIG. 18, shown therein is a flow 1800 illustrating delegation of authentication and permission gathering to the agent 320 during the authorization assessment, according to an embodiment.

The flow 1800 shows the requesting party 316 responding to the client's ticket request using their agent 320.

The flow 1800 includes a user agent 1828.

The user agent 1828 is a local browser software. The user agent 1828 is implemented at a device used by a person to connect to the system components (e.g. agent software).

The user-agent 1828 is an important concept in OAuth because the actual end-user uses the user agent 1828 software. The user agent 1828 is a source of many security considerations.

The authorization server 318 seeks permissions from the resource owner 310. On receiving an authorization grant request from a client 314, the requesting party 316 is able to select their agent 320. The authorization server 318 gives control to the agent 320 with the requesting party 316 to determine which permissions will be used to respond to the client's request. The interaction follows the OIDC implicit request flow where the authorization server 318 is a client 314 to the agent 320.

At 1810, the authorization server 318 receives the claims-gathering request for a client's ticket.

At 1812, if the client 314 provides an agent 320, the requesting party 316 is redirected to the agent 320 immediately.

The authorization server 318 redirects the requesting party 316 to the agent 320 for authentication and permission gathering. The OIDC scope includes the client's ticket, representing the resources requested.

Example 27 below shows a sample redirect request of the authorization server 318 redirect of the requesting party 316 to the agent 320 for permission gathering.

HTTP/1.1 302 Found
Location: https://agent.ca/transaction/authorize?
Scope-aTicket%20oidc
&client_id=clientIdofAS
&state=9-yaQbAbgVkCovPJIUSMjtPfwA7PP_zhDhM12rIhehQ
&redirect_uri=https://as.com/transaction/callback At 1814, if the client 314 does not provide an agent 320, the authorization server 318 presents the options to the requesting party 316.

At 1816, the requesting party 316 selects the agent 320 they want to use.

At 1818, the requesting party 316 is redirected to the agent 320.

The authorization server 318 redirects the requesting party 316 to the agent 320 for authentication and permission gathering. The OIDC scope includes the client's ticket, representing the resources requested.

Example 27 below shows a sample redirect request of the authorization server 318 redirect of the requesting party 316 to the agent 320 for permission gathering.

HTTP/1.1 302 Found
Location: https://agent.ca/transaction/authorize?
Scope-aTicket%20oidc
&client_id=clientIdofAS
&state=9-yaQbAbgVkCovPJIUSMjtPfwA7PP_zhDhM12rIhehQ
&redirect_uri=https://as.com/transaction/callback At 1820, the requesting party 316 authenticates with the agent 320 and the authorization server 318. The requesting party 316 creates permissions for the resources requested in the client's ticket.

Agent 320 response to the authorization server 318 on permission gathering success. If the requesting party 316 authentication was successful, the response includes a secured id_token JWT signed by the agent 320.

The id_token includes a reference to a recent resource owner 310 authentication session and a list of permission ids to use to fulfill the client's capability.

Example 28 below shows a sample ID token payload of agent 320 response to the authorization server on permission gathering success.

```
{
  "nonce" : "aNonce",
  "permissions" : [ ],
  "authentication_key" : "",
  "sub" : "fpe.12345abcde",
  "iss" : "fpe.agent.ca"
  "aud" : "fpe.as.ca",
  "exp" : 1538498961,
  "iat" : 1538498961,
}
```

A nonce is from the original request authorization server OIDC request.

permissions is a list of permissions for this request.

authentication_key is the current resource owner 310 session from the most recent authentication event.

sub DID is created by the resource owner 310/agent 320. This can be random per transaction, repeated to the same client, etc.

iss is the agent 320.

and is the authorization server 318.

exp is an expiration timestamp, which is agent 320/resource owner 310 defined.

iat is an issued timestamp.

Example 29 below shows a sample response of the agent 320 response to the authorization server 318 on permission gathering success.

HTTP/1.1 302 Found
Location: https://as.ca/transaction/callback?
id_token=eyJhbGciOiJIUzI
&state=9-yaQbAbgVkCovPJIUSMjtPfwA7PP_zhDhM12rIhehQ If the resource owner 310 fails to authenticate or chooses to reject the client's request, the response to the authorization server 318 includes an error code.

Example 30 below shows a sample response of the agent server response to the authorization server 318 on permission gathering failure.

HTTP/1.1 302 Found
Location: https://as.ca/transaction/callback?
error=invalid_request
&error_description=Unsupported%20response_type_%20value
&state=9-yaQbAbgVkCovPJIUSMjtPfwA7PP_zhDhM12rIhehQ At 1822, the agent 320 redirects the requesting party 316 back to the authorization server 318 with the authentication and permissions.

At 1824, the authorization server 318 receives and evaluates the authentication and permissions.

At 1826, the authorization server 318 redirects the requesting party 316 back to the client 314 with the claims-gathering result (including a new permission ticket).

Example 14 below shows a sample response of authorization server 318 redirection of requesting party 316 back to the client 314 after claims-gathering.

HTTP/1.1 302 Found
Location: https://as.ca/transaction/callback?
Ticket=226A2331-73FC-4087-9B07-56E41E49DA02
&state=9-
yaQbAbgVkCovPJIUSMjtPfwA7PP_zhDhM12rIhehQ The client request authorization grant for a capability ticket will now be described.

The client 314 presents a capability or permission ticket to the authorization server 318 to receive authorization. Authorization depends on the ability of the requesting party 316 to authentication and provide valid permissions to fulfill the resources requested by the client 314.

Privacy considerations of the system 300 will now be described.

The privacy of the resource owner 310 is a central goal of federated privacy exchange. In practice, different implementations may define acceptable profiles to accomplish their specific privacy requirements. The resource owner 310 interacts with all other entities in the system 300 and can expect some level of privacy. The privacy of the resource owner 310 should only be reduced with the consent and control of the resource owner 310.

Privacy of the resource owner's relationship to an identity provider 322 will now be described.

The resource owner 310's choice of identity provider 322 can (and should) be hidden from the rest of the network. The two entities that gain some information about the resource owner 310's relationship to an identity provider 322 are the agent 320 and authorization server 318.

The agent 320 has a direct relationship with the identity provider 322 on behalf of the resource owner 310. The agent 320 knows the resource owner's chosen agent 320 and receives the resource owner's user data # from the identity provider 322. The resource owner's choice of identity provider 322 is disclosed to the agent 320.

The authorization server 318 maintains a list of approved identity providers 122 and the maximum LOA of the each identity provider's user data, as defined by the ASO. The authorization server 318 is able to verify that an identity assertion about a resource owner 310 was issued by an approved identity provider 322 during account creation.

The privacy of the resource owner 310 may be preserved at the authorization server 318 if the identity assertion does not reveal the specific issuing identity provider 322, only that it was issued by one of the approved identity providers 122.

To ensure auditability of the system, the identity assertion can (should) be recorded with the resource owner 310 account. The assertion can (should) be stored in a way that allows the issuing identity provider 322 to prove their relationship to the account, without gaining information about that account's subsequent interaction with the network.

Privacy of the resource owner's relationship to a resource server 312 will now be described.

The resource owner 310 establishes a relationship with a resource server 312 before the resource owner 310 can consent to have the resource server 312 share information with a client 314. The relationship represents the resource owner's access rights to data at the resource server 312. This relationship is core to the system 300 and is used, in some form, by many entities. The initial relationship is between the agent 320 and resource server 312, where downstream entities, the authorization server 318 and client 314, should only learn derived information.

The agent 320 has a direct relationship with the resource server 312 on behalf of the resource owner 310. The agent 320 may not know the identity of the resource owner 310 to the resource server 312; this depends on the user data shared by the resource server 312 to the agent 320 after authentication.

Also, depending on the relationship method, the agent 320 may hold a secret, allowing the agent 320 to create permissions without the resource owner's presence. This may be a desired property of some deployments.

The resource owner 310 identity at the resource server 312 will now be described.

The resource server 312 does not necessarily know the identity of the resource owner 310. For example, the resource server 312 may maintain public information that the resource server 312 can provide for any resource owner 310. In this case, the resource owner's recorded consent may be more important than the contents of the data. For example, the resource could represent different terms of service the client 314 requires the resource owner 310 to accept.

The resource server 312 may only know a set of attributes about the resource owner 310, such as a pre-established secret or asserted role.

This resource server 312 follows a form of attribute-based access control.

The resource server 312 may need to uniquely, and strongly, identify the resource owner 310. For example, if the resource server 312 holds personal data, the resource server 312 should have a strong authentication method for the resource owner 310 before creating the relationship. The established relationship may be reinforced by verification of the resource owner 310 when they use it with clients 114. The resource server 312 may make an independent authorization decision based on the assurance of the resource owner 310 relationship. For example, the resource server 312 may choose to modify responses or reduce allowed scopes until the relationship receives additional verification.

The relationship method between the resource owner 310 and resource server 312 will now be described.

The relationship method defines how data shared by the resource owner 310 and resource server 312 allows the agent 320 to create proofs of consent that are recorded on the authorization server 318. The supported relationship method is shared by the resource server 312 and agent 320. For example, if the relationship secret is a static value, it will make any resource owner 310 transaction involving that resource server 312 linkable. The agent 320 can create permissions with the value and send them to the authorization server 318. A more complex relationship secret method may allow the resource owner 310 to create unlinkable proofs of consent at the authorization server 318, while still allowing the resource server 312 to resolve the resource owner's relationship upon receiving the proof.

Sharing relationship information between resources owners 310 will now be described.

The relationship method may allow a resource owner 310 to delegate all or part of the relationship, and the access rights it represents, to another resource owner 310. This may allow a party other than the resource owner 310 to consent to have an resource owner's data disclosed by an resource server 312. This method of guardianship should be closely evaluated before deployed to determine the scope of what can be permitted by the other party and how, or if, the client 314 learns that the data received may not belong to the requesting party 316.

The resource owner 310 relationship to the resource server 312 at the client 314 will now be described.

The client 314 may learn about a resource owner 310's relationship to a resource server 312 when receiving authorization to request the resource owner's protected resource. If desired, the client 314 should not learn which resource server 312 is issuing data about the requesting party 316 or about any other permissions issued by the requesting party 316 using the same resource server 312.

If there are a small number of approved resource servers 112 who may issue a type of resource, the client 314 may automatically know which resource server 312 the resource owner 310 is using. The privacy impact of this knowledge is situational and sometimes intended. For example, there may be multiple sources of a resource but a single authoritative source that the client 314 requires. One potential technique to prevent this type of disclosure would be for the authorization server 318 to operate a gateway between clients and resource server 312. The authorization server 318 would issue a different resource server 312 location to the client 314 that would be unique per transaction.

The resource owner 310's privacy at the client 314 will now be described.

A primary concern of the system 300 is the ability of the resource owner 310 to control the information disclosed to a client 314. The authorization server 318 records the permission used by the requesting party 316 to fulfill a client's request. Each client 314 request may be linked to specific permissions, without allowing the permission to be linked back to a specific resource owner 310 account.

The traceability of the same requesting party 316 to the client 314 during separate transactions can be selective.

Sometimes this is unavoidable, specifically when the issued resource contains a global unique identifier for the resource owner 310. However, the transaction identifiers used by the system 300 may take different forms with differing privacy impacts. The use of unique transaction identifiers for each transaction may be a resource owner 310 or ASO policy. The resource owner 310 may choose the identifier to use for a client's transaction, to allow the client 314 to link them between specific transactions.

The resource owner 310 should also be aware that the client's user agent may be able to create some linkage or maintain some state between transaction. However, the client 314 has no assurance that separate transactions are being completed by the same requesting party 316.

The privacy of the resource owner 310 at the agent 320 will now be described.

The agent 320 collects information about the resource owner 310 as they operate with the system 300. The agent 320 acts on behalf of the resource owner 310 to mediate communication between other network actors.

The resource owner 310 choice of agent 320 will now be described.

The resource owner's privacy may be most easily exposed when there are a small number of agents 120 on the network or if the resource owner 310 cannot bring their own agent 320. In these situations, the resource owner 310 must completely trust the approved agent 320 to act correctly and follow the direction of the resource owner 310.

The holder of the resource owner 310 private keys will now be described.

The best way for the resource owner 310 to ensure privacy control may be to maintain their keys in an authenticator, separate from the agent 320. All resource owner 310 transactions on the authorization server 318 may require authentication through use of a credential registered during account creation. If the resource owner 310 maintains control of the authenticator, it can prevent a malicious agent 320 from performing unapproved operations.

The agent 320 participates in the resource owner's relationship to a resource server 312. The protocol used to establish the relationship can (should) allow the resource owner 310 to control the private keying material required to authenticate and create proofs. If the agent 320 holds the relationship keys, the authorization server 318 should enforce some requirement of account authentication before it will accept a recorded permission. Separation of data at the agent 320 between local and cloud components will now be described.

Another privacy consideration arises when the agent 320 maintains specific user data elements. The agent 320 operates on two levels: a cloud and a local component. The cloud side of the agent 320 may be controlled entirely by the agent 320 and offers a web accessible API. The privacy of the resource owner 310 is an inverse to the amount of their data the agent 320 knows and sends online. However, there may be techniques which allow the data to be shared online while maintaining its privacy.

The data held in the cloud may help create a more convenient user experience for the resource owner 310; for example, to support a web agent (browser) experience or to provide account backup and recovery mechanism. In certain cases, the agent 320 may hold and operate the resource owner's secret keys online and even act without their presence.

Privacy and trust at the authorization server 318 will now be described.

For the resource owner 310, a fully privacy respecting authorization server 318 may act in certain privacy-respecting ways. Such privacy-respecting ways may include: never holding personal data; allowing any resource owner 310 to register, without unveiling the selected identity provider 322; allowing the resource owner 310 to control the account identifier; allowing the resource owner 310 to authenticate without traceability to a specific account; and creating and revoking permissions without traceability to the account; maintaining unlinkability between resource owner 310 transactions.

Operationally, the authorization server 318 plays a central and trusted role to all other system 300 participants. The authorization server 318 can betray the system 300 in a few ways. The authorization server 318 could actively interfere in correct operation; for example, by improperly issuing authorization to a client, giving the wrong resource owner's permission to the resource server 312 during introspection, or modifying approved participants or their terms of use. The resource server 312 could also refuse requests to prevent people from interacting or using the system 300. The authorization server 318 may monitor all requests and attempt to correlate an resource owner's activity.

These challenges exist in most centralized systems. The federated privacy exchange, and system 300, may deal with such challenges in two ways. First, by defining a cryptographic system that allows verification without unique identification. Second, the lack of personal data at the authorization server 318 allows the authorization server 318 to be operated on a distributed consensus-based ledger. Most issues can be resolved by allowing multiple instances of the authorization server 318 to operate using different ASOs but with the same underlying ledger. The modification of approved participants and rights could only exist locally to a bad operator. If the bad authorization server 318 tried to propagate the changes, the other behaving instances can reject the modification.

Attempts to monitor a resource owner 310 may be avoided by an agent 320 by changing the authorization server 318 used to create the permission. The distributed operation of the network may also address some non-privacy related challenges, such as definition of trusted communities across legal boundaries.

The systems and methods of the present disclosure, including extensions to UMA 2.0, may improve the privacy of resource owners 110 whenever they transact online. The federated privacy exchange may also enable ASOs to present only trusted participants to resource owners 310. These online communities can provide transparency to the resource owner 310 about why their data is needed and how it will be processed by a client 314. The specification may be built following the Privacy By Design principles, which may increase the privacy of the resource owner 310 and also create new value and opportunities for all participants.

Introduction of the agent 320 role may allow the resource owner 310 to own and securely hold and operate a digital ID while also separating personal data from the authorization server 318. The agent 320 is a digital point of contact for the resource owner 310, enabling a user-centric system where the resource owner 310 may use the same agent 320 with many resource servers 112 and federated privacy exchange deployments.

The agent 320 role can also represent the resource owner 310 in a self-sovereign identity (SSI) ecosystem. For example, the system 300 may be aligned to the Decentralized Identifiers (DID) and Verifiable Claims (VC) standards. In this model, the agent 320 becomes a "holder" for the resource owner 310, and resource server 312 relationships and consents may be constructed as VCs.

In an embodiment, the system 300 follows and supports the development of the Decentralized Key Management System (DKMS) standard, which may help define the agent's cloud and edge components, along with other functionality such as account backup and recovery.

The authorization server 318 is assigned an additional responsibility to maintain a registry of approved resources, participants and capabilities. Clients 114 integrate directly to the authorization server's resource definitions and may receive access to many resources across many resource servers 112 by issuing a single authorization request.

ASO-defined resource profiles encourage interoperability and reduce the integration effort of both resource servers 112 and clients 114.

Participant registration can be offered using either a public or permissioned model. In either model, the authorization server 318 may be operated by a consortium, allowing consensus-based changes to the ecosystem participants. For example, a group of hospitals could operate an authorization server 318 to more easily identify and provide trusted services to their community members.

Example embodiments of the systems and methods of the present disclosure will now be described, with reference to FIGS. 19A, 19B, 20A, and 20B.

Figure 19A:
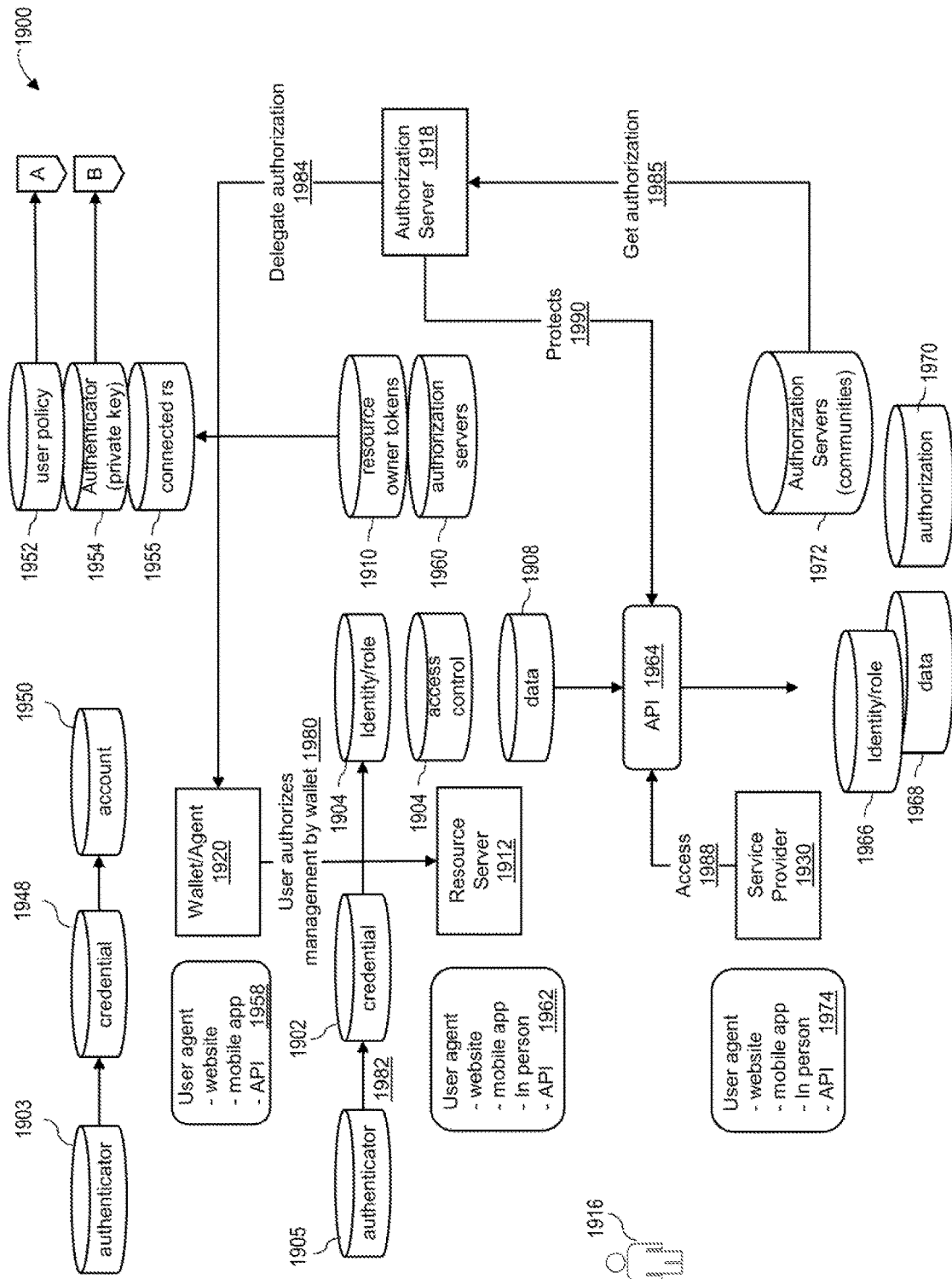
FIGS. 19A and 19B are a block diagram of a distributed authorization system, according to an embodiment.
Figure 19B:
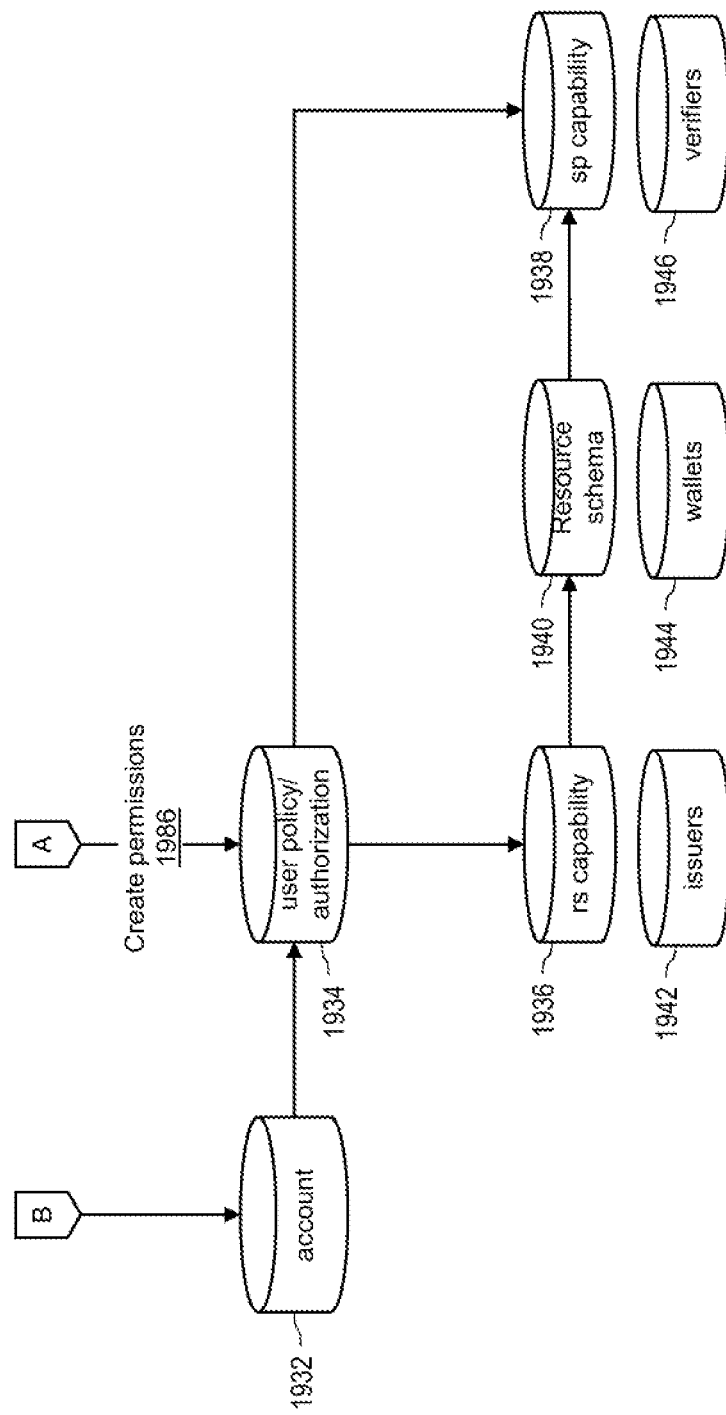

Referring now to FIGS. 19A and 19B, shown therein is a distributed authorization system 1900 for a federated privacy exchange, according to an embodiment. The system 1900 includes a federated privacy exchange extension on an UMA model.

The system 1900 includes a requesting party/person/user 1916, an authorization server 1918, a wallet/agent 1920, a resource server 1912, and a service provider 1930 (client).

The system 1900 also includes a first authenticator 1903 and a second authenticator 1905. The two systems, agent 1920 and resource server 1912, use the authenticators 1903 and 1905, respectively, to maintain independent means to authenticate the user against their local account.

The authorization server 1918 stores account data 1932, user policy/authorization data 1934, resource server capability data 1936, service provider capability data 1938, resource schema data 1940, issuers data 1942, wallets data 1944, and verifiers data 1946.

The wallet 1920 stores credential data 1948, account data 1950, user policy data 1952, authenticator (private key) data 1954, and connected resource server data 1955.

The wallet 1920 includes a user agent 1958. The user-agent 1958 is a local software, such as a browser. The user agent 1958 may be a website, a mobile app, or an API. The user agent 1958 is the device the person is using to connect to the system components (such as the agent 1920 software). The user-agent 1958 is an important concept in OAuth because the actual end user uses the user agent 1958 software and the user agent software is the source of many security considerations.

The resource server 1912 stores credential data 1902, identity/role data 1904, access control data 1906, data 1908, resource owner tokens 1910, and authorization server tokens 1960.

The resource server 1912 also includes a user agent 1962. The user agent 1962 may be a website, mobile app, in-person, or through an API.

The resource server 1912 also includes an API 1964. The API 1964 is the resource being protected by the system 1900.

The service provider 1930 stores identity/role data 1966, data data 1968, authorization data 1970, and authorization servers (communities) data 1972.

The service provide 1930 also includes a user agent 1974. The user agent 1974 may be a website, mobile app, in-person, or an API.

FIGS. 19A and 19B also show a flow of operation of the system 1900.

At 1980, the user 1916 authorizes management by the wallet 1920.

At 1982, get authorization includes authorization servers (communities) communicating with the authorization server 1918.

At 1984, authorization is delegated, which includes the authorization server 1918 delegating authorization to the wallet 1920.

At 1985, a get authorization operation is performed. The client 1930 is starting the OAuth flow by sending the client 1930 to an authorization server 1918 known by the client (service provider 1930).

At 1986, permissions are created as the user pushes their authorization permission/policy to the authorization server 1918. This permission allows the service provider (client) 1930 to access the user's data at the resource server 1912 through a resource server API (e.g. API 1964).

At 1988, access to the user's data at the resource server 1912 is provided to the service provider 1930 via the API 1964.

At 1990, the API 1964 is protected by authorization from the authorization server 1918. The access request (e.g. made at 1988) fails if the access request does not include sufficient authorization from the authorization server 1918. At 1990, the resource server 1912 validates the client-provided authorization to make sure the client-provided authorization is still valid (e.g. not expired, not revoked by the resource owner, etc.).

Generally, in system 1900, the user 1916 interacts directly with the service provider 1930. This may occur via the user agent 1974. The service provider 1930 participates with authorization servers 1918 as a trust authority.

The user 1916 has a preexisting relationship with the wallet 1920. The wallet 1920 is subscribed to the authorization server 1918 (can discover wallets though the authorization server 1918).

The user 1916 can discover and put resources under management of the wallet 1920.

Figure 20A:
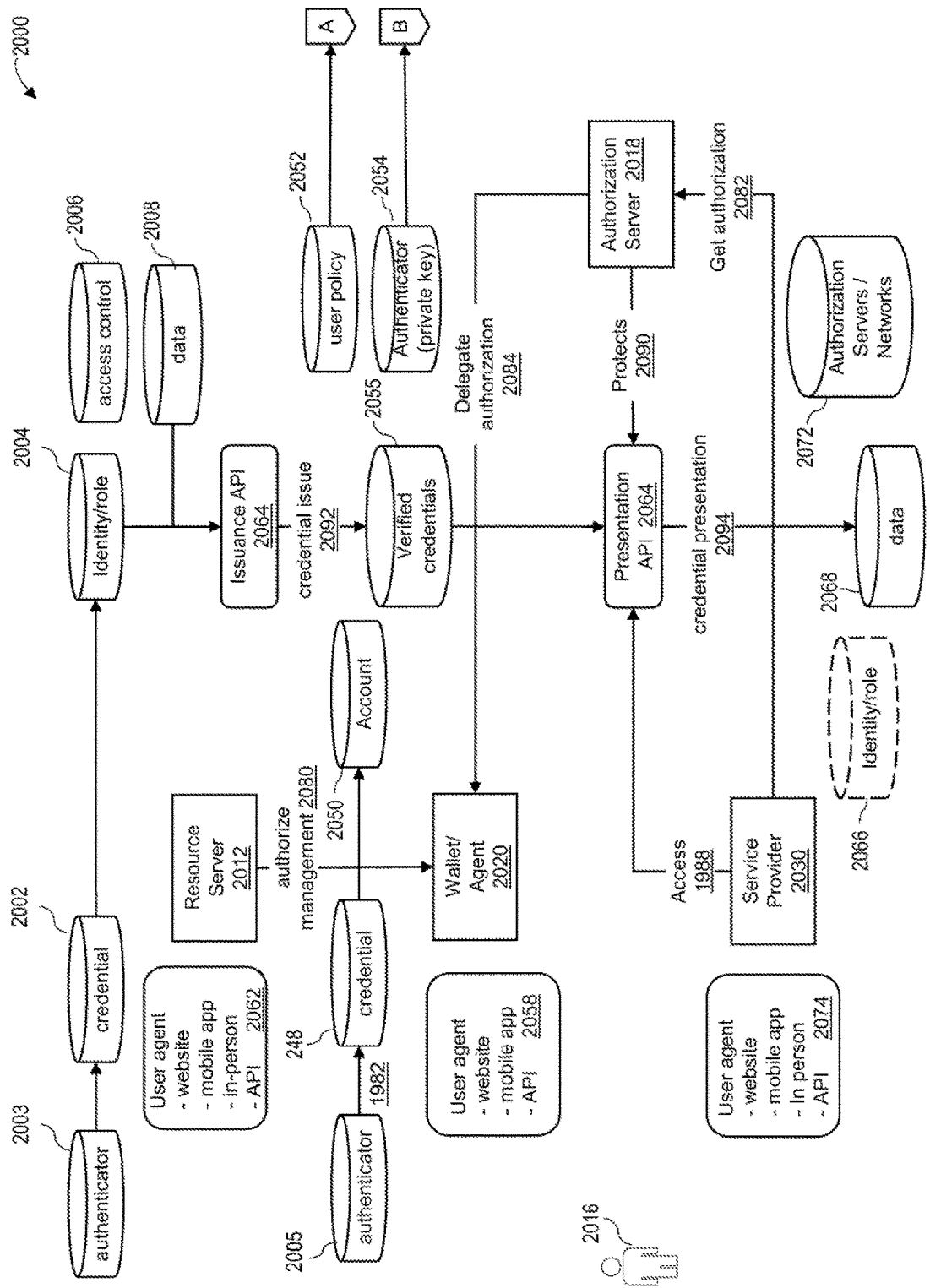
FIGS. 20A and 20B are a block diagram of a distributed authorization system, according to an embodiment.
Figure 20B:
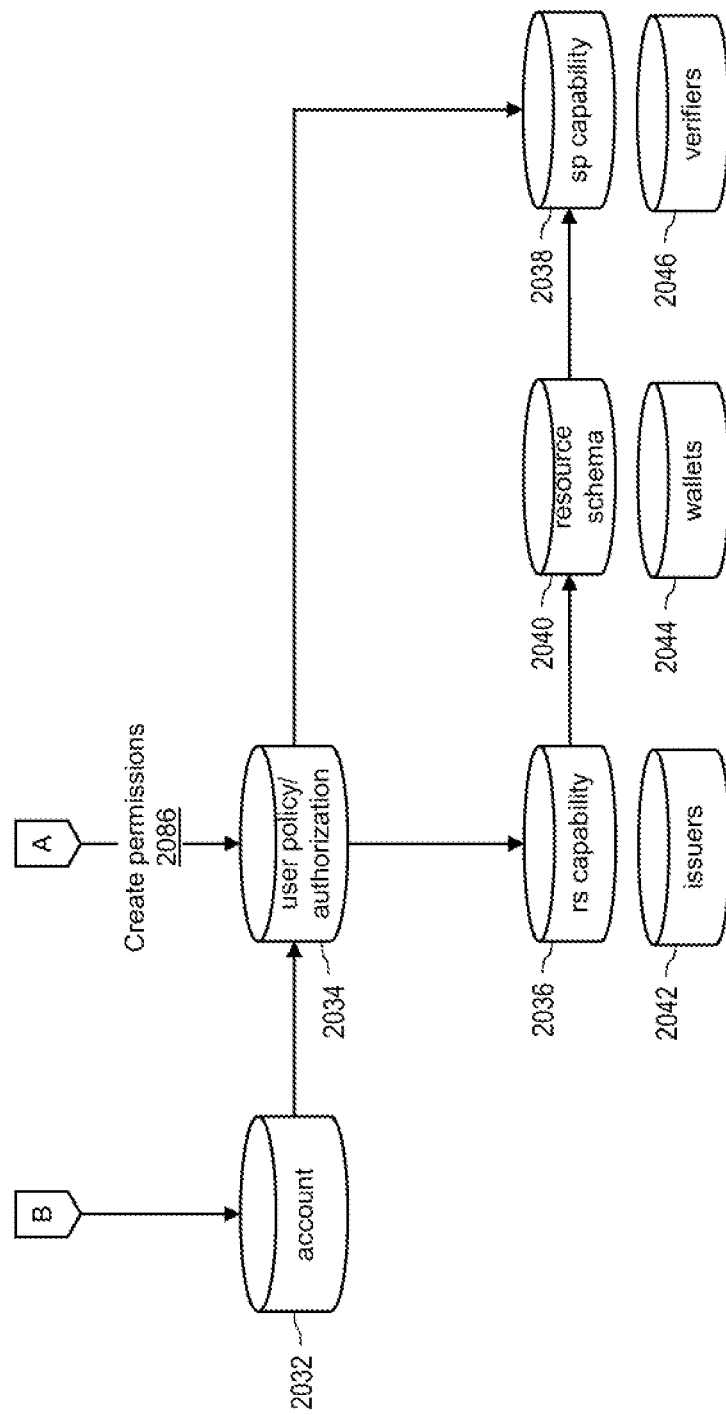

Referring now to FIGS. 20A and 20B, shown therein is a system 2000 for a federated privacy exchange, according to an embodiment. The system 2000 includes a federated privacy exchange extension on an SSI DID+VC model.

The system 2000 includes a requesting party/person/user 2016, a wallet/agent 2020, an authorization server 2018, a resource server 2012, and a service provider 2030.

The system 2000 also includes a first authenticator 2003 and a second authenticator 2005. The authenticators 2003, 2005 function similarly to authenticators 1903 and 1905 of FIGS. 19A and 19B.

The authorization server 2018 stores account data 2032, user policy/authorization data 2034, resource server capability data 2036, service provider capability data 2038, resource schema data 2040, issuers data 2042, wallets data 2044, and verifiers data 2046.

The wallet 2020 stores verified credential data 2048, account data 2050, user policy data 2052, authenticator (private key) data 2054, and verified credentials data 2055.

The wallet 2020 includes a user agent 2058. The user agent 2058 may be a website, a mobile app, or an API. The user agent 2058 functions similarly to the user agent 1958 of FIGS. 19A and 19B.

The wallet 2020 also includes a presentation API 2056. The presentation API 2056 allows the resource owner/agent 2020 to directly show verified data to a service provider client 2030. This credential presentation requires a previous credential issuance from the resource server 2012 to the agent 2020.

The resource server 2012 stores credential data 2002, identity/role data 2004, access control data 2006, and data 2008. Data 2008 is arbitrary data that the resource server 2012 holds.

The resource server 2012 also includes a user agent 2062. The user agent 2062 may be a website, mobile app, in-person, or through an API.

The resource server 2012 also includes an issuance API 2064. Credential presentation is a specific API type where the resource server 2012 and the agent 2020 perform a more complicated sequence in order to issue a signed data credential to the agent 2020. The credential allows the agent 2020 to independently present the credential to a client 2014 without involving the resource server 2012 during presentation.

The service provider 2030 stores identity/role data 2066, data 2068, and authorization servers/networks data 2072.

The service provider 2030 also includes a user agent 2074. The user agent 2074 may be a website, a mobile app, in-person, or an API.

FIGS. 20A and 20B also shows a flow of operation of the system 2000.

At 2080, authorize management. The resource server 2012 communicates with the wallet 2020 to authorize management.

At 2082, get authorization. The service provider 2030 gets authorization from the authorization server 2018.

At 2084, delegate authorization. The authorization server 2018 delegates authorization to the wallet 2020.

At 2086, create permissions. A user policy at the wallet 2020 is used to create permissions stored at the authorization server 2018 as user policy/authorization.

At 2088, access. The service provider accesses the presentation API 2056. The same way as for resource access. a client 2014 with authorization from the authorization server 2018 accesses an API at a resource server 2012 (in this case the resource server 2012 is the agent 2020). This requests presentation of an SSI credential.

At 2090, authorization server 318 protects access to the presentation API 2056. This protection functions similarly to the protection step 1990 of FIGS. 19A and 19B.

At 2092, credential issued from issuance API 2064 to wallet 2020 and stored at wallet 2020 as verified credentials.

At 2094, credential presentation from presentation API 2056 to data stored at service provider 2030 using verified credentials stored at wallet 2020. If the client 2014 is sufficiently authorized, the agent 2020 (resource server 2012) returns a verified credential presentation to the client 2014 containing RO data.

The UMA authorization server is split into a wallet and an authorization server. This enables governance of the authorization server. Community governance. Doesn't have any data and has no incentive to collect data and/or act nefariously.

In traditional model, the authorization is provided by the entity providing the server. The system promotes privacy by separating community governance from personal data.

The authorization service (distributed authorization system) may allow a citizen to operate verifiably but pseudonymously online in a way that minimizes disclosure and eliminates central knowledge of private information or digital relationships.

The authorization service may include an authorization first flow for user-based consent to support a data exchange, which may include a UMA extension/profile and a centralized resource definition. The centralized resource definition may result in a one-to-many integration pattern among authorization server participants.

The authorization service may also include a distributed authenticator/digital wallet. The distributed authenticator/digital wallet configuration splits the functions of the authorization server into two distinct roles. In doing so, the system may enable a privacy respecting (zero-knowledge) authorization server. The system uses pseudonymous public key cryptographic identities and relationships that are verifiable by not identifiable on a public, private, central registry or distributed ledger. The authentication component is the agent (e.g. agent 320). This role is split out from a traditional OAuth/UMA authorization server which would perform the functions of the federated privacy exchange authorization server 318 and the federated privacy exchange agent 320. In federated privacy exchange, although the authorization server 318 still maintains an account and authentication mechanism for a resource owner 310, the requirements are minimal. The more complex account, authentication, and session management is offloaded to the agent 320.

The distributed authorization system of the present disclosure extends the UMA protocol to support governance, providence, and regulatory goals (and not just technical), a privacy respecting authorization server, the role of an "agent" or "digital wallet", centralized definition of resources, and user control of "self-sovereign" capabilities.

The distributed authorization system adds data definitions in the UMA authorization server.

The distributed authorization system splits the functions of the UMA authorization functions into two distinct components having distinct roles. The two distinct components include an authorization server and a wallet/agent.

The distributed authorization system also includes technical specifications to support regulatory considerations.

Self-Sovereign Identity is the only other attempt to solve each of the problems, however it doesn't include specification for supporting regulatory considerations. It is a 'technology only' specification that also converges onto silos of implementations. It also doesn't address 'capabilities of parties'. Lightest Trust Schema (German Gov) is a governance support for regulatory requirements, but it doesnt' address the technical protocols. It doesn't support user control. SecureKey, Vivvo, UK. Gov are examples where by these challenges are overcome by process, and operators. Transferring the challenge to Trusted Operator who would 'probably not' break privacy or spy on citizens—therefore our solutions also solves the 'Honest but curious' challenge.

The distributed authorization system of the present disclosure may provide various advantages. The system may provide portability of identity across siloed data or authoritative sources of information. The system may provide self-sovereign identity with conformance and compliance. The system may provide a hub and spoke integration pattern for interoperability that minimizes party direct connections. The system may provide an opaque (privacy respecting) but trusted network which enables disclosure minimization online. The system may provide a network that facilitates interfaces but collects no private information or relationships. The system may provide a contextual-based authentication based on authorized data from multiple sources. The system may provide a virtual multi-party "gateway". The system may solve larger privacy and data exchange challenges.

Further the distributed authorization system of the present disclosure may significantly reduce integration effort for parties. The system may enable rich connections between parties without collecting private information. The system may open up a scalable "OAuth" for private, sensitive, or compliance-based data online. The system may create a privacy respecting capability for limiting disclosure. The system may offer verifiable transactions for any party but only identifiable to the user.

The distributed authorization system of the present disclosure may overcome disadvantages of existing approaches to authorization. For example, the system may overcome the need for a central operator trusted with the transactions. Further, the system may overcome the requirement for authorization to be bound to specific authentication.

The distributed authorization system of the present disclosure solves an inherently computer-based problem in that the system enables proof of identity digitally or online transactions and also enables authorization based on the proof of identity.

The system includes a federated privacy exchange (FPX or FPE). The FPX is a next generation identity and access management technology which provides digital authentication, authorization, and governance to enable trusted ecosystems and complex integrations across a jurisdiction and not just inside the enterprise.

Referring now to FIG. 21, shown therein is a distributed authorization system 2100 for implementing a federated privacy exchange, according to an embodiment. FIG. 21 illustrates a sequence of steps and data flow performed by the system 2100.

The system 2100 includes an authorization server 2118, a wallet (or agent) 2120, a resource server 2112, and a client 2114. Each of the components 2112, 2118, 2120, 2114 perform functions that are the same or similar to the functions of those components of FIG. 3 and described herein having corresponding reference numerals (e.g. client 314, client 2114).

The system 2100 includes a centralized resource definition manager module 2182 located at the authorization server 2118.

The system 2100 also includes distributed authenticator modules 2184, 2186 located at the authorization server 2118 and wallet 2120, respectively.

The wallet 2120 separates the correlatable user account and policy admin UI from the central authorization server 2118, such as via the digital authenticator module 2186.

The authorization sever 2118 stores resource definitions 2130. The resource definitions 2130 allow client 2114 and resource server 2112 capabilities to be defined against a generic resource definition versus a client capability to a specific resource server (as in core OAuth). The resource definitions 2130 allow policy at the authorization server 2118 to be defined against generic API schema vs specific resource server. The user consents to allow a specific resource server 2112 to fulfill the generic schema for a specific client 2114.

The system 2100 also includes a browser 2132.

The authorization server 2118 is communicatively connected to the wallet 2120, the client 2114, the resource server 2112, and the browser 2130.

The client 2114 is communicatively connected to the resource server 2112.

The wallet 2120 is communicatively connected to the resource server 2112.

At 2150, the process flow starts. The client 2114 requests authorization. Because the authorization server 2118 is not tightly coupled to a single or specific resource server. When the client 2114 performs authorization server-first (as opposed to resource server-first, as in UMA) flows, the client 2114 indicates which resource definitions 2130 the client 2114 is trying to access (versus specific resource servers 2112). This is performed through static capability registration.

At 2152, the authorization server 2118 communicates with the browser 2132 which includes selecting an agent (without agent login hint).

At 2154, the user selects their wallet. This step is used because the authorization server 2118 does not provide a policy administration point (UI) to the user, and instead delegates to a wallet (e.g. wallet 2120).

At 2156, the authorization server 2118 redirects to the wallet 2120. The authorization server 2118 delegates to the wallet 2120. This interface means the authorization server 2118 does not perform the wallet role directly (as in OAuth/UMA). The consequence of this is that the authorization server 2118 does not learn information about the specific resource owner (i.e. privacy-respecting or zero-knowledge authorization server). This may improve ability to scale and ecosystem between organizations. Implementations where the authorization server learns information about the specific resource own such as OAuth/UMA, may be difficult to scale and ecosystem between organizations. In such cases, the authorization server learns information about the resource owner, which can make it difficult to scale and ecosystem between organizations.

At 2158, the wallet 2120 responds to the request. This step may include resource owner policy management. The resource owner can create many accounts to control how traceable they are at the authorization server. The authorization server has some control over the valid population because account registration requires proof of an authentication event at an approved identity provider (could be resource server or wallet). When creating policy the resource owner chooses the ROT (specific resource server and specific pseudonym) to use to further reduce their traceability, and to control the subject identifier the authorization server knows and presents to the client. The resource owner can revoke/change policy at any time from their wallet/agent. The authorization server represents the current policy during token introspection (when the resource server asks, "is this token still valid?").

At 2160, the wallet 2120 connects to the resource server 2112. The resource owner uses the wallet 2120 to make the resource owner-unique connection to the resource server 2112. This connection allows many pseudonyms to be established between the agent and resource server. This allows the resource owner to stay anonymous when interacting with the authorization server 2118 or client 2114. The authorization server 2118 does not learn anything about a specific resource owner.

At 2162, the wallet 2120 redirects to the authorization server 2118.

At 2164, the authorization server 2118 redirects to the client 2114. The client 2114 may receive multiple access tokens after performing a single flow, one for each specific (resource definition 2130, resource server 2112) that has been authorized.

At 2166, the client 2114 requests a token. The authorization server 2118 also adds a new parameter for resource server discovery, each granted access token is packaged with the specific resource server 2112 at which the token can be redeemed. This is done as a result of the loose coupling.

At 2168, the client 2114 requests a resource using the token. The API is generic across many resource owners. This may prevent leaking information about the resource owner to the client 2114 before consent can be given.

At 2170, the resource server 2118 introspects the token. The introspection response includes an additional field ROT. This is the pseudoanon value the agent 2120 established with the resource server 2112 during 2160.

In core UMA, the resource server 2112 interacts with the authorization server 2118 to create a protection API access token (PAT), create a resource, and create a permission.

For core UMA, in creating the PAT, the resource server is expected to get a token directly representing the resource owner by sending the resource owner to authenticate at the authorization server. In the system 2100, the resource server 2112 gets a PAT using client credentials (resource server "is" resource owner). In this way, registered resources do not uniquely identify a specific resource owner and the authorization server 2118 does not learn anything about a specific resource owner.

For core UMA, in creating the permission, registered resources must (somehow) uniquely identify the resource owner. In the system 2100, resources are registered generically against authorization server-defined resource definitions (resource definitions 2130) and scopes. The authorization server 2118 does not learn anything about a specific resource owner.

The system 2100 may optionally include a resource server adapter 2180. The resource server adapter 2180 can implement and take over responsibilities of the resource server 2112 in the network, and the resource server 2112 only has to integrate and customize the resource server adapter 2180 to meet its own profile of data and users.

The resource server 2112 may delegate some or all of its responsibility for the registration of protected resources, the mechanism for recovering the user's data access rights (e.g. as described in reference to FIG. 11, above), establishing the trust of authorization grants issued by an authorization server, and any other roles and responsibilities within the system 2100, to a separate service, referred to herein as the resource server adapter 2180.

The resource server adapter 2180 may provide an interface for the resource owner (e.g. resource owner 310) to set policy or controls over their protected resources, and may provide the means to resolve requests made to it by clients (e.g. client 2114), after introspection and inspection of a provided authorization grant, to the resource server's APIs or digital objects.

The resource server adapter 2180 may enforce the resource server's access controls and policy enforcement rules to any client requests.

The resource server adapter 2180 may allow an existing resource server 2112 to integrate and fulfill its role in the network without further changes to its core API or data structure, other than the mechanism to respect or further assess requests made from resource server adapter 2180 once the resource server adapter 2180 has introspected and made an access decision based on the authorization grant provided by a client 2114.

The resource server adapter 2180 may provide intelligent policy enforcement.

While the above description provides examples of one or more apparatus, methods, or systems, it will be appreciated that other apparatus, methods, or systems may be within the scope of the claims as interpreted by one of skill in the art.

The invention claimed is:

1. A computer-implemented system for distributed authorization, the system comprising:
   a resource server which stores a protected resource of a resource owner and respects authorization server-issued authorization grants;
   a service provider client device, the service provider client device configured to provide a service which uses the protected resource;
   a federated privacy exchange system configured to provide an authorization service for allowing the service provider client device to access the protected resource according to permissions data, the federated privacy exchange system comprising:
   an authorization hardware server configured to:
      register the protected resource against a generic resource definition that does not identify the resource owner and that can be mapped by the resource server to the protected resource when responding to the service provider client device upon successful authorization of access to the protected resource, wherein a capability of the service provider client device or a capability of the resource server is defined against a resource definition, the resource definition comprising an interface schema;
      provide a resource owner interface for an agent device to authenticate the resource owner; and delegate permission gathering and authentication to the agent device upon receiving a request from the service provider client device; and the agent device configured to:
provide an agent interface for managing credentials and controlling permissions and policies at the authorization hardware server; and
store protected data including any one or more of account identifier data, authenticator data, resource server relationship data, and permissions data.

2. The system of claim 1, wherein the authorization hardware server is further configured to control any one or more of a governance registry, a registry of approved clients, resource servers, and agents, and a privacy-respecting ledger of resource owner data including account data and permissions data, wherein the permissions data records a resource owner-directed data authorization policy including client capability data and resource server capability data.

3. The system of claim 1, wherein the system enables an OAuth extension which allows a single call to connect to any number of protected resources stored in one or more resource servers, and wherein as part of a client authorization process, the service provider client device is given a token per granted resource, thereby allowing access to the one or more resource servers.

4. A computer-implemented system for providing an authorization service for allowing a service provider client device to access a protected resource stored at a resource server, the system comprising:
an authorization hardware server configured to:
register the protected resource against a generic resource definition that does not identify the resource owner and that can be mapped by the resource server to the protected resource when responding to the service provider client device upon successful authorization of access to the protected resource, wherein a capability of the service provider client device or a capability of the resource server is defined against a resource definition, the resource definition comprising an interface schema;
provide a resource owner interface for an agent device to authenticate the resource owner; and
delegate permission gathering and authentication to the agent device upon receiving a request from the service provider client device; and
the agent device communicatively connected to the authorization hardware server, the agent device configured to:
provide an agent interface for managing credentials and controlling permissions and policies at the authorization hardware server; and
store protected data including any one or more of account identifier data, authenticator data, resource server relationship data, and permissions data.

5. The system of claim 4, wherein the authorization hardware server is further configured to store a privacy-respecting ledger of resource owner data including account data and permissions data.

6. The system of claim 4, wherein the authorization hardware server is further configured to control any one or more of a governance registry and a registry of approved clients, resources servers, and agents.

7. The system of claim 4, wherein the agent interface includes a user interface configured to perform any one or more of registering a new account, authenticating to an account, interacting with an authenticator, managing permissions, and handling client resource requests.

8. The system of claim 4, wherein the authorization hardware server is further configured to delegate permission gathering and authentication to the agent device upon receiving a request from the service provider client device.

9. The system of claim 4, wherein a client capability is registered generically against the generic resource definition.

10. The system of claim 4, wherein the protected resource is registered generically against the generic resource definition.

11. The system of claim 4, wherein the system enables an OAuth extension which allows a single call to connect to any number of protected resources stored in one or more resource servers.

12. A method of authorizing access by a service provider client to a protected resource stored at a resource server using a resource definition, the method comprising:
defining a capability of the service provider client or a capability of the resource server against a resource definition, the resource definition comprising an interface schema;
storing the resource definition at an authorization hardware server;
providing a resource owner interface for an agent device to authenticate the resource owner;
delegating permission gathering and authentication to the agent device upon receiving a request from the service provider client; and
registering, at the authorization hardware server, the protected resource generically against a generic resource definition, wherein the generic resource definition does not identify the resource owner and can be mapped by the resource server to the protected resource when responding to the service provider client upon successful authorization of access to the protected resource.

13. The method of claim 12, further comprising:
defining policy conditions comprising authorization grant rules at the authorization hardware server against the interface schema.

14. The method of claim 12, further comprising:
fulfilling the interface schema for a specific service provider client by a specific resource server that receives a generic request from the specific service provider client and resolves the generic request.

15. The method of claim 12, further comprising:
receiving, at the authorization hardware server, user consent allowing a specific resource server to fulfil the interface schema for a specific service provider client.

16. The method of claim 12, further comprising:
defining, via the generic resource definition, contents of a successful response from the resource server to the service provider client upon successful authorization of access to the protected resource.

17. The method of claim 12, further comprising:
integrating directly from the service provider client to the generic resource definition at the authorization hardware server; and
providing access to one or more protected resources at one or more resource servers via a single authorization request issued by the service provider client.

* * * * *